(12) United States Patent
Targhi et al.

(10) Patent No.: US 11,214,997 B1
(45) Date of Patent: Jan. 4, 2022

(54) MULTI-LINKAGE VEHICLE DOOR HINGE

(71) Applicants: Ali Tavakoli Targhi, Sunnyvale, CA (US); Donald R. Monroe, Los Gatos, CA (US); Johan Karlsson, Santa Clara, CA (US); Steven H. Klotz, Sunnyvale, CA (US)

(72) Inventors: Ali Tavakoli Targhi, Sunnyvale, CA (US); Donald R. Monroe, Los Gatos, CA (US); Johan Karlsson, Santa Clara, CA (US); Steven H. Klotz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 16/859,080

(22) Filed: Apr. 27, 2020

Related U.S. Application Data

(63) Continuation of application No. 16/050,582, filed on Jul. 31, 2018, now Pat. No. 10,648,210.

(60) Provisional application No. 62/563,215, filed on Sep. 26, 2017.

(51) Int. Cl.
  *B60J 7/00* (2006.01)
  *E05D 3/18* (2006.01)
  *B60J 5/04* (2006.01)

(52) U.S. Cl.
  CPC .............. *E05D 3/18* (2013.01); *B60J 5/0473* (2013.01); *E05Y 2900/531* (2013.01)

(58) Field of Classification Search
  CPC ........ E05Y 2900/531; E05Y 2900/132; Y10T 16/547; Y10T 292/1082; B62D 35/001; B62D 35/007; E05C 17/006; E05F 15/63
  See application file for complete search history.

(56) References Cited

U.S. PATENT DOCUMENTS

| | | | | | |
|---|---|---|---|---|---|
| 3,006,683 | A | * | 10/1961 | Smith | E05D 3/147 49/248 |
| 3,599,262 | A | * | 8/1971 | Carder | B65G 69/24 14/71.5 |
| 3,800,711 | A | * | 4/1974 | Tuttle | B61D 7/28 105/251 |
| 3,805,708 | A | * | 4/1974 | Schuller | B61D 7/18 105/251 |
| 3,833,240 | A | * | 9/1974 | Weiler | B60R 3/02 280/166 |

(Continued)

FOREIGN PATENT DOCUMENTS

| | | |
|---|---|---|
| CN | 201416329 Y | 3/2010 |
| DE | 2854884 A1 | 6/1980 |
| KR | 366897 B1 | 11/2008 |

*Primary Examiner* — Kiran B Patel
(74) *Attorney, Agent, or Firm* — Young Basile Hanlon & MacFarlane, P.C.

(57) ABSTRACT

A multi-linkage vehicle door hinge and door hinge system for use in passenger vehicle entry/exit doors. The door hinge includes a first four bar linkage connected to a second four bar linkage. The door hinge operates to move a vehicle door panel between a closed position and an open position along a path of travel in a movement envelope that is parallel to the exterior surface of the vehicle. In one aspect, the door hinge provides twice as much lift as is required to package the door hinge in the vehicle. In another aspect, the door panel further rotates toward the vehicle centerline for applications having low vertical clearance. In another aspect, the door hinge includes a six-bar linkage.

20 Claims, 20 Drawing Sheets

(56) References Cited

U.S. PATENT DOCUMENTS

| | | | | |
|---|---|---|---|---|
| 4,180,943 A * | 1/1980 | Smith | B64C 1/1407 | 244/129.5 |
| 4,440,364 A * | 4/1984 | Cone | B64C 1/24 | 16/282 |
| 4,560,123 A * | 12/1985 | Sealey | B64C 1/143 | 244/129.5 |
| 4,828,317 A * | 5/1989 | Muscat | B60J 7/1286 | 296/107.07 |
| 5,551,826 A * | 9/1996 | Todd | B62D 33/067 | 180/89.14 |
| 5,597,991 A * | 1/1997 | Chen | H01H 9/22 | 200/50.02 |
| 5,627,767 A * | 5/1997 | Gabiniewicz | G01L 5/22 | 701/102 |
| 5,722,704 A * | 3/1998 | Chaput | E05B 65/0811 | 292/26 |
| 6,111,378 A * | 8/2000 | LeMay | B60R 16/0315 | 15/250.17 |
| 6,179,546 B1 * | 1/2001 | Citrowske | A61G 3/06 | 414/543 |
| 6,382,705 B1 * | 5/2002 | Lang | B60J 5/0479 | 296/146.12 |
| 6,386,613 B1 * | 5/2002 | Vader | B60J 5/108 | 296/146.12 |
| 7,055,160 B1 * | 5/2006 | Tan | E05D 15/40 | 49/323 |
| 8,132,515 B2 * | 3/2012 | Forbes | B61D 7/02 | 105/406.1 |
| 8,636,182 B1 * | 1/2014 | Gordon | B60P 3/14 | 224/404 |
| 9,045,025 B1 | 6/2015 | Greene et al. | | |
| 9,365,284 B2 * | 6/2016 | Sakurai | B64C 9/22 | |
| 9,452,703 B2 | 9/2016 | Weiner et al. | | |
| 9,539,948 B1 * | 1/2017 | Presley | B60R 3/02 | |
| 2002/0194705 A1 * | 12/2002 | Liang | E05D 3/147 | 16/336 |
| 2004/0084929 A1 * | 5/2004 | Neubrand | B60J 7/1265 | 296/107.15 |
| 2006/0097542 A1 * | 5/2006 | Dilluvio | B60J 7/0069 | 296/107.09 |
| 2006/0249978 A1 * | 11/2006 | Rosler | B60J 7/146 | 296/107.08 |
| 2007/0152473 A1 * | 7/2007 | Lechkun | B60J 5/0479 | 296/146.12 |
| 2007/0176389 A1 * | 8/2007 | VanBelle | B60R 3/02 | 280/166 |
| 2007/0262591 A1 * | 11/2007 | Wright | E05B 83/36 | 292/216 |
| 2007/0283535 A1 | 12/2007 | Hoffman | | |
| 2008/0018064 A1 * | 1/2008 | Martin | B60G 17/017 | 280/6.152 |
| 2008/0106109 A1 * | 5/2008 | Brown | B60R 7/04 | 296/37.7 |
| 2008/0196312 A1 * | 8/2008 | Brown | E05F 17/004 | 49/334 |
| 2008/0296925 A1 * | 12/2008 | Fallis, III | B60J 1/183 | 296/108 |
| 2009/0096246 A1 * | 4/2009 | Patzer | E05F 3/14 | 296/146.11 |
| 2010/0301629 A1 * | 12/2010 | Fallis, III | B60J 7/146 | 296/108 |
| 2012/0010749 A1 * | 1/2012 | van der Merwe | A61F 2/70 | 700/264 |
| 2012/0119016 A1 * | 5/2012 | Shaw | B64C 27/20 | 244/12.3 |
| 2012/0167842 A1 * | 7/2012 | Zysk | F01P 3/18 | 123/41.05 |
| 2012/0318588 A1 * | 12/2012 | Kroese | B60G 3/08 | 180/41 |
| 2013/0076064 A1 * | 3/2013 | Smith | B62D 35/001 | 296/180.1 |
| 2013/0154212 A1 * | 6/2013 | Vandergon | B60P 3/341 | 280/13 |
| 2013/0319984 A1 * | 12/2013 | Linyaev | B23K 26/38 | 219/121.72 |
| 2014/0066148 A1 * | 3/2014 | Dilts | A01F 12/40 | 460/111 |
| 2014/0093403 A1 * | 4/2014 | Jones | F04D 29/605 | 417/234 |
| 2014/0102286 A1 * | 4/2014 | Dawson | F41A 25/22 | 89/14.3 |
| 2014/0252795 A1 * | 9/2014 | Willard | B60J 7/1265 | 296/108 |
| 2014/0260735 A1 * | 9/2014 | Roberts | A47B 51/00 | 74/98 |
| 2014/0263122 A1 * | 9/2014 | Roberts | A47B 51/00 | 211/88.01 |
| 2014/0263766 A1 * | 9/2014 | Venton-Walters | F16F 7/104 | 239/726 |
| 2015/0147144 A1 * | 5/2015 | Frazier | B60P 1/43 | 414/495 |
| 2015/0225049 A1 * | 8/2015 | Fairfield | B63B 22/00 | 89/1.13 |
| 2015/0251606 A1 * | 9/2015 | Murray | B60R 11/00 | 296/37.1 |
| 2015/0343936 A1 * | 12/2015 | Weiner | B60P 3/007 | 296/24.3 |
| 2016/0016656 A1 * | 1/2016 | Thompson | B64D 1/06 | 49/400 |
| 2016/0122975 A1 * | 5/2016 | Vanek | E02F 9/0891 | 180/69.2 |
| 2016/0236556 A1 * | 8/2016 | Smith | B60J 7/1291 | |
| 2017/0020757 A1 * | 1/2017 | Tessmer | A61G 7/0516 | |
| 2017/0089110 A1 * | 3/2017 | Tavakoli-Targhi | B60R 13/0243 | |
| 2017/0137075 A1 * | 5/2017 | Povinelli | B62D 37/02 | |
| 2017/0138056 A1 * | 5/2017 | Albertson | E04F 10/0685 | |
| 2017/0233015 A1 * | 8/2017 | Knutson | E02F 9/2004 | 296/190.05 |
| 2017/0259908 A1 * | 9/2017 | Omeara | B64C 9/16 | |
| 2018/0024558 A1 * | 1/2018 | Tacklind | G05D 1/021 | 180/218 |
| 2018/0044956 A1 * | 2/2018 | Gerhardt | E05D 15/32 | |
| 2018/0080265 A1 * | 3/2018 | Sandler | B62D 33/0273 | |
| 2018/0148957 A1 * | 5/2018 | Och | E05B 85/107 | |
| 2018/0186454 A1 * | 7/2018 | Luckay | G05D 1/0094 | |
| 2019/0008710 A1 * | 1/2019 | Wilson | A61G 7/1074 | |
| 2019/0071291 A1 * | 3/2019 | Puszkiewicz | B66F 9/0655 | |
| 2019/0135091 A1 * | 5/2019 | Erhardt | B60J 5/02 | |
| 2019/0210221 A1 * | 7/2019 | Delaporte | B25J 9/1612 | |
| 2019/0210484 A1 * | 7/2019 | Deckard | B60N 2/01 | |
| 2019/0210738 A1 * | 7/2019 | Arany-Kovacs | B64C 1/14 | |
| 2019/0232915 A1 * | 8/2019 | Szente | E05B 77/08 | |
| 2019/0249471 A1 * | 8/2019 | Patel | E05B 79/06 | |
| 2019/0254235 A1 * | 8/2019 | Hackert | A01F 15/0715 | |
| 2019/0315278 A1 * | 10/2019 | Watson | H01H 13/06 | |
| 2019/0325220 A1 * | 10/2019 | Wildgrube | G06K 9/00805 | |

* cited by examiner

MULTI-LINKAGE VEHICLE DOOR HINGE

CROSS-REFERENCE TO RELATED APPLICATIONS

This application is a continuation of U.S. patent application Ser. No. 16/050,582, filed on Jul. 31, 2018, which claims the benefit of U.S. Provisional Application No. 62/563,215, filed on Sep. 26, 2017. The contents of the foregoing applications are hereby incorporated by reference in their entireties for all purposes.

TECHNICAL FIELD

This application generally relates to devices for moving rigid panels relative to a vehicle body in vehicle systems.

BACKGROUND

Typical passenger vehicle doors open and close by pivoting around a generally vertical hinge axis. Alternative door opening and closing movements have been utilized in some vehicles. Examples include gull-wing doors that are hinged along a generally horizontal axis at the roofline of the vehicle and may include two pivotally-related door panels, and scissor doors that rotate vertically at a fixed hinge at the front of the door opening. Adoption of alternative door opening and closing movements has been limited, due to the lateral space needed to open the door, and/or due to the mechanical complexity of the door hinge and associated structure.

SUMMARY

A multi-linkage vehicle door hinge and system is disclosed. The multi-linkage vehicle door hinge includes a first four bar linkage connected to the vehicle door frame and a second four bar linkage connected to the vehicle door panel. A coupling member is connected the first and the second four bar linkages allowing the first and the second four bar linkages to rotate relative to one another to move the door panel along a path of travel between a closed position and an open position.

In one aspect of the multi-linkage vehicle door hinge, the door panel moves between the closed position and the open position in a door panel movement envelope that is substantially parallel to the exterior surface of the vehicle. This allows for a very compact and efficient movement of the door panel requiring very little clearance to each side of the vehicle to open and close the door panel while allowing use of substantially all of the door opening to enter and exit the passenger cabin.

In another aspect of the disclosure, the multi-linkage vehicle door hinge positions a portion of the second four bar linkage inboard toward the center of the vehicle to overlap a portion of the first four bar linkage. This provides for a spatially compact and efficient hinge design which reduces the width of the door panel movement envelope relative to the exterior surface of the vehicle.

In another aspect, the coupler is a rigid bar that integrates the first four bar linkage fourth link and the second four bar linkage first link in a single, unitary member preventing relative movement between the first four bar linkage fourth link and the second four bar linkage first link. In other aspects of the disclosure, the coupler can take other forms including gears or cam structures which can further tailor and control movement of the first and second four bar linkages relative to one another. This provides flexibility of design and further control over the door panel path of travel and the door panel envelope relative to the exterior surface of the vehicle to suit the vehicle design.

In another aspect of the disclosure, the multi-linkage vehicle door hinge first and second four bar linkages' construction and articulation provide for a two-to-one ratio between vertical door lift height to the length or height of the door hinge in a closed position. That is, the multi-linkage hinge provides twice as much vertical lift of the door panel than the space needed to package the door hinge in the vehicle.

In another aspect, a second movement or articulation of the first and/or the second four bar linkages is made to rotate the top portion of the vehicle door panel inward toward the centerline of the vehicle to reduce the door panel movement envelope in a vertical direction. This provides added flexibility for the user in areas where there is limited clearance vertically above the vehicle, for example in parking structures and residential garages or carports.

In another aspect, a multi-linkage vehicle door hinge system includes a six-bar or link door hinge which provides one or more of the benefits as described for the multi-linkage vehicle door hinge system and hinge including the stacked first four bar linkage and the second four bar linkage.

DETAILED DESCRIPTION

A multi-linkage vehicle door hinge and door hinge system is disclosed in an exemplary use in passenger vehicle entry/exit doors to the passenger cabin. In one aspect, the multi-linkage vehicle door hinge uses two connected four bar linkages and a coupler to provide a door panel path of travel and a door panel movement envelope that is substantially parallel and close to the exterior surface of the vehicle. The geometric positioning and articulation of the two four bar links further provide for compact packaging of the door hinge in the vehicle, a narrow door panel movement envelope, and increased door lift height for maximum use of the door opening for ease of entering and exiting the passenger cabin. In another aspect, the multi-linkage vehicle doors system and door hinge is disclosed in the form of a six-bar linkage door hinge.

Figure 1A:
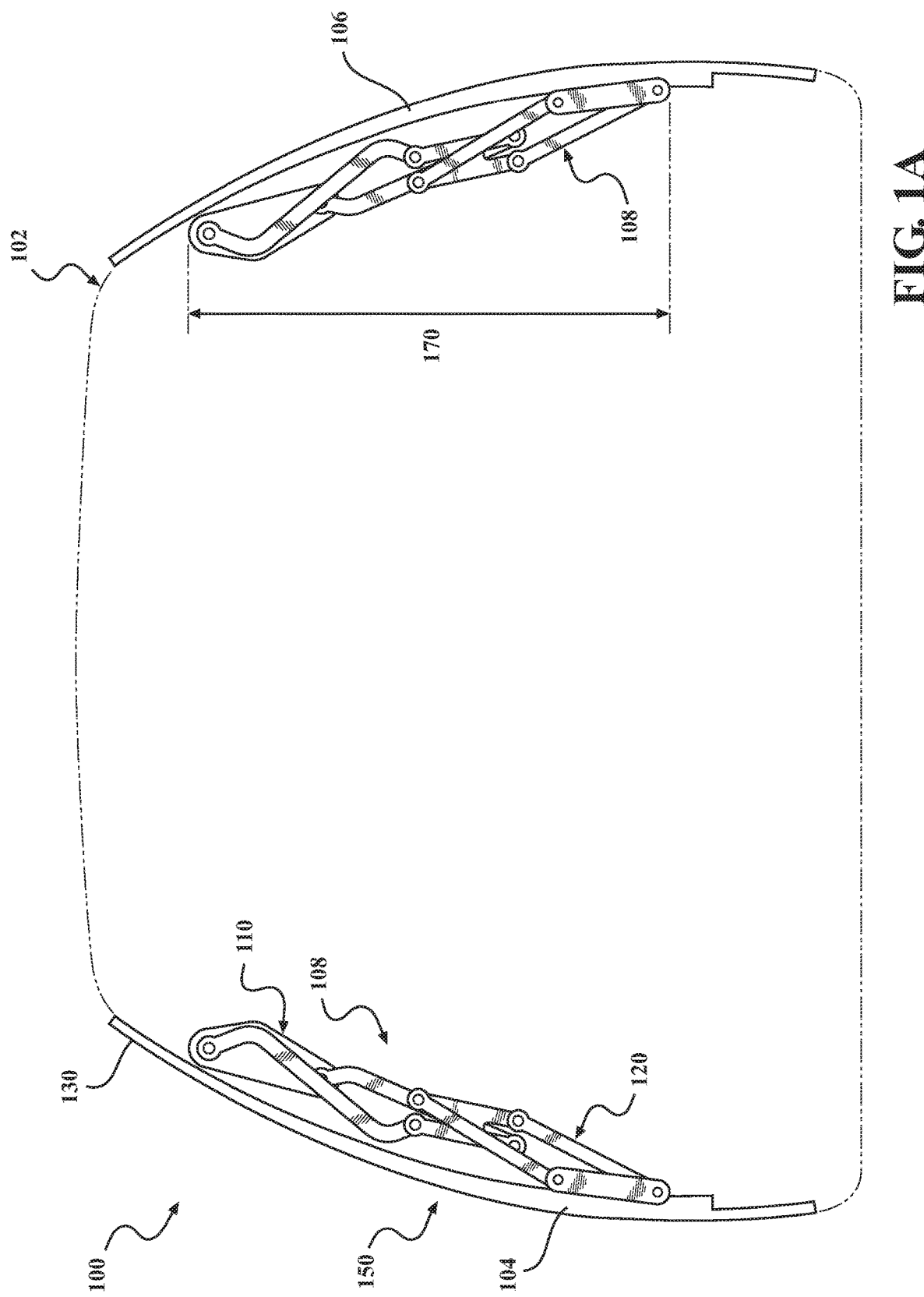
FIG. 1A is a front view of a pair of multi-linkage vehicle door hinges shown in a closed position.
Figure 1B:
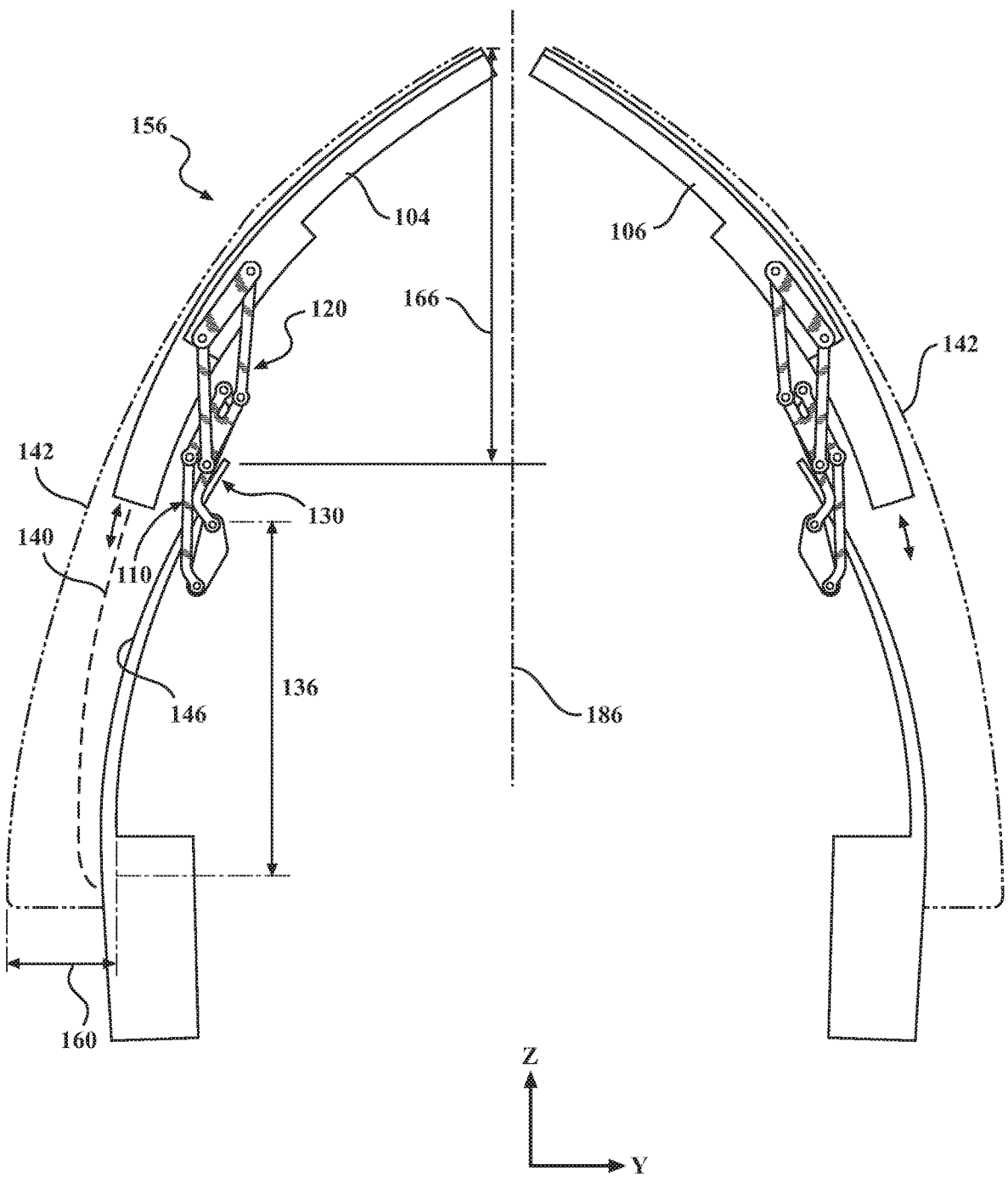
FIG. 1B is an alternate view of FIG. 1A showing the multi-linkage vehicle door hinges in an open position.

Referring to FIGS. 1A and 1B, one aspect of a multi-linkage vehicle door hinge system 100 is shown in an exemplary use in a passenger vehicle 102 having a first door panel 104 and a second door panel 106. Each of the first door panel 104 and the second door panel 106 includes a door hinge 108, which is a multi-linkage vehicle door hinge having a first four bar linkage 110 and a second four bar linkage 120. In one aspect, depending on the size and weight of the first door panel 104 and the second door panel 106, two or more door hinges 108 may be used for each of the first door panel 104 and the second door panel 106 (only one door hinge 108 is shown for each of the first door panel 104, and the second door panel 106 for ease of illustration). For ease of description throughout the disclosure, only one of the door hinges 108 used on the first door panel 104 will be described. The description is equally applicable to the second door panel 106 and additional ones of the door hinges 108.

As best seen in FIG. 1B, the passenger vehicle 102 includes a door frame 130 defining a door opening 136 through which passengers enter and exit from the passenger vehicle 102. The door frame 130 is traditionally formed by welded sheet metal or composite materials providing for a robust anchor point for the first door panel 104 and related hardware to move and secure the first door panel 104 to the passenger vehicle 102.

In the aspect illustrated, the first door panel 104 travels along a path of travel 140 (shown in dashed line). The physical space occupied by the first door panel 104 as it moves along the path of travel 140 defines a movement envelope 142. The movement envelope 142 includes the physical space extending outward from an exterior surface 146 of the passenger vehicle 102 to the outward most point that the first door panel 104 passes through (shown as 142 in phantom line) along the geometric coordinate y (horizontal) and z (vertical) directions along the path of travel 140. In other words, the movement envelope 142 defines the physical space that the first door panel 104 moves through as the first door panel 104 travels along the path of travel 140 between a closed position 150 (shown in FIG. 1A) and an open position 156 (shown in FIG. 1B).

In the aspect shown in FIG. 1B, once the first door panel 104 is disengaged from the door frame 130 (for example the door latch handle is actuated disengaging the door latch from the striker plate), the path of travel 140 and movement envelope 142 of the first door panel 104 is substantially parallel to the exterior surface 146 of the passenger vehicle 102. This is an improvement and advantage over alternate vehicle door hinge designs, such as example gull-wing designs.

In one aspect best seen in FIG. 1B, the outermost portion of the movement envelope 142 is a distance 160 of 400 millimeters (mm) from the exterior surface 146 in the y-coordinate direction. Further, the door panel path of travel includes a door panel path of travel length (shown as a vertical lift distance 166) of 1000 to 1500 millimeters (mm) in the z-coordinate direction. This narrow-width implementation of the movement envelope 142 (in the y-coordinate direction) and extended lift capability (in the z-coordinate direction) is an improvement and an advantage of alternate vehicle door hinge designs, for example gull-wing designs. Alternate sizes, shapes, orientations, directions and lengths of the path of travel 140 and the movement envelope 142, may be used to suit the particular application and performance specifications.

Referring to the aspect shown in FIGS. 1A and 1B, the door hinge 108 has a door hinge height length 170 in a closed position (shown in FIG. 1A) that is approximately 500-750 millimeters (mm). That is, the door hinge 108 requires about 500-750 mm of vertical space to be packaged within the interior of the passenger vehicle 102. As shown in FIG. 1B, the door hinge 108 may have a vertical lift advantage to package height by a factor of two (2). In other words, the door hinge 108 provides two (2) times the length of the vertical lift distance 166 of the first door panel 104 than is required by the door hinge 108 to package the door hinge height length 170 in the interior of the passenger vehicle 102. Alternate values for the door hinge height length 170, the vertical lift distance 166, lifting to packaging space ratios, and mechanical advantages may be used to suit the particular application and performance specifications.

Figure 1C:
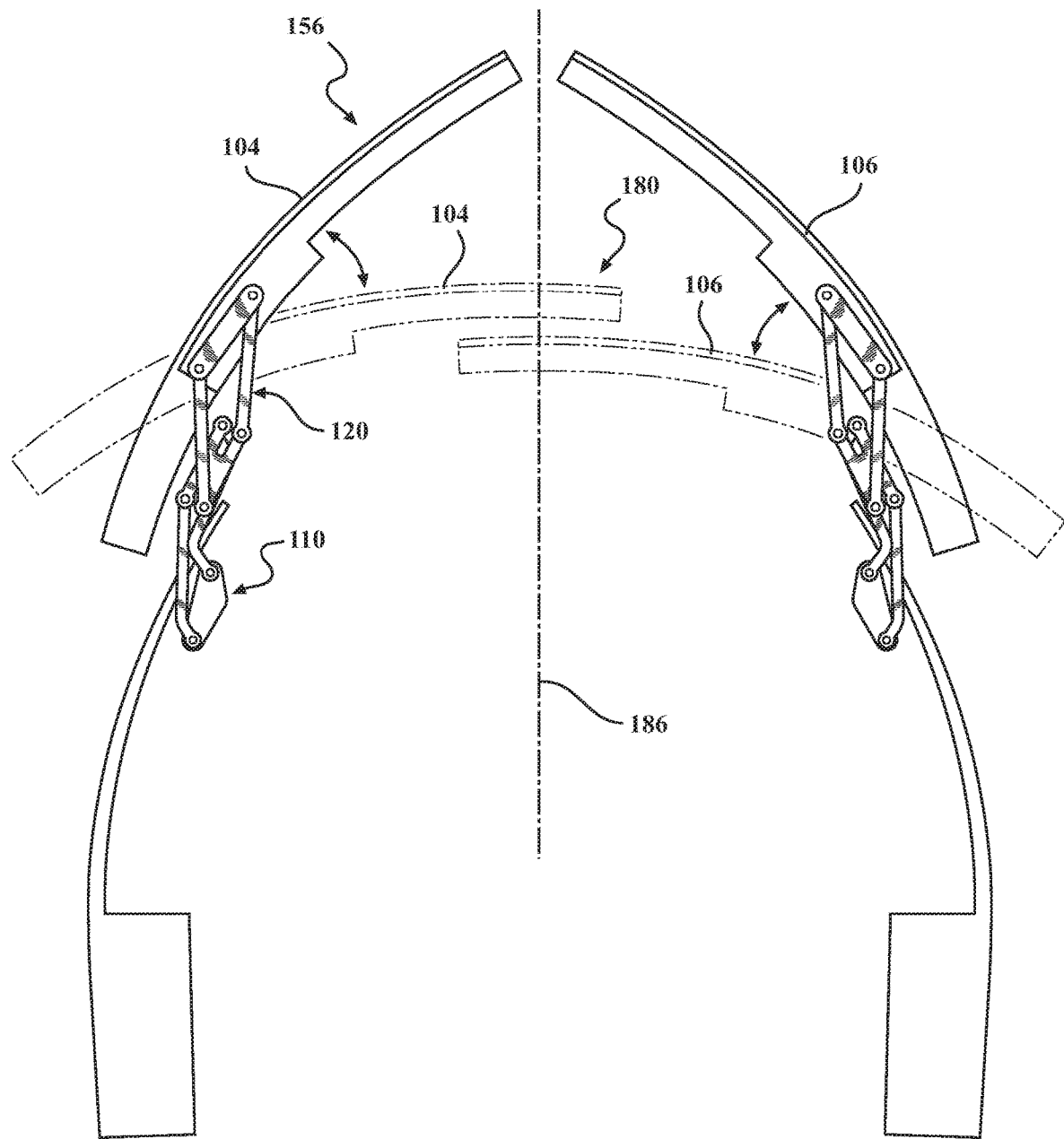
FIG. 1C is an alternate view of FIG. 1B showing the multi-linkage vehicle door hinges in an alternate open position wherein the door panels are rotated inward and downward toward the center of the vehicle.

Referring to FIG. 1C, an alternate aspect of the multi-linkage vehicle door hinge system 100 and door hinge 108 is shown. In the example, the first door panel 104 and the second door panel 106 are respectively lifted along the path of travel 140 as previously described, but then are selectively articulated to a folded down position 180 through a rotational movement toward a centerline 186 of the vehicle. This second rotation and "folding down" of the doors toward the centerline 186 is useful where the passenger vehicle 102 encounters insufficient vertical clearance above the vehicle for the first door panel 104 and the second door panel 106 to fully raise to a position illustrated in FIG. 1B.

In one aspect of FIG. 1C, two separate actuators (not illustrated), for example electric motors, are used. A first actuator serves to provide vertical lift to the first door panel 104 along the path of travel 140 as previously described, and a second articulator provides movement to rotate the first door panel 104 toward the centerline 186. In one example, a pivot point (further described below) of one of the first four bar linkage 110 or the second four bar linkage 120 may be moved and/or repositioned allowing rotation of the first door panel 104 toward the centerline 186.

In an alternate aspect of FIG. 1C, the travel or articulation paths of the first four bar linkage 110 and/or the second four bar linkage 120 may be changed to provide for the secondary movement/rotation of the first door panel 104 and the second door panel 106 toward the centerline 186 of the vehicle. In one aspect, the first four bar linkage 110 and the second four bar linkage 120 can be timed or sequenced to, for example, first lift the first door panel 104, and when the first door panel 104 reaches a certain predetermined vertical height along the z-coordinate axis above the door frame 130, rotate the second door panel 106 toward the centerline 186 at an earlier time than first door panel 104 such that second door panel 106 nests underneath the first door panel 104 in a fully-opened position as shown in FIG. 1C (position 180 shown in phantom line). Other devices, movements, translations, sequences of movement, and timing of movement, of the first four bar linkage 110 and second four bar linkage 120 to achieve the described second movement of the first door panel 104 and the second door panel 106 to an open position of a lower vertical height than that shown in FIG. 1B may be used.

Figure 2A:
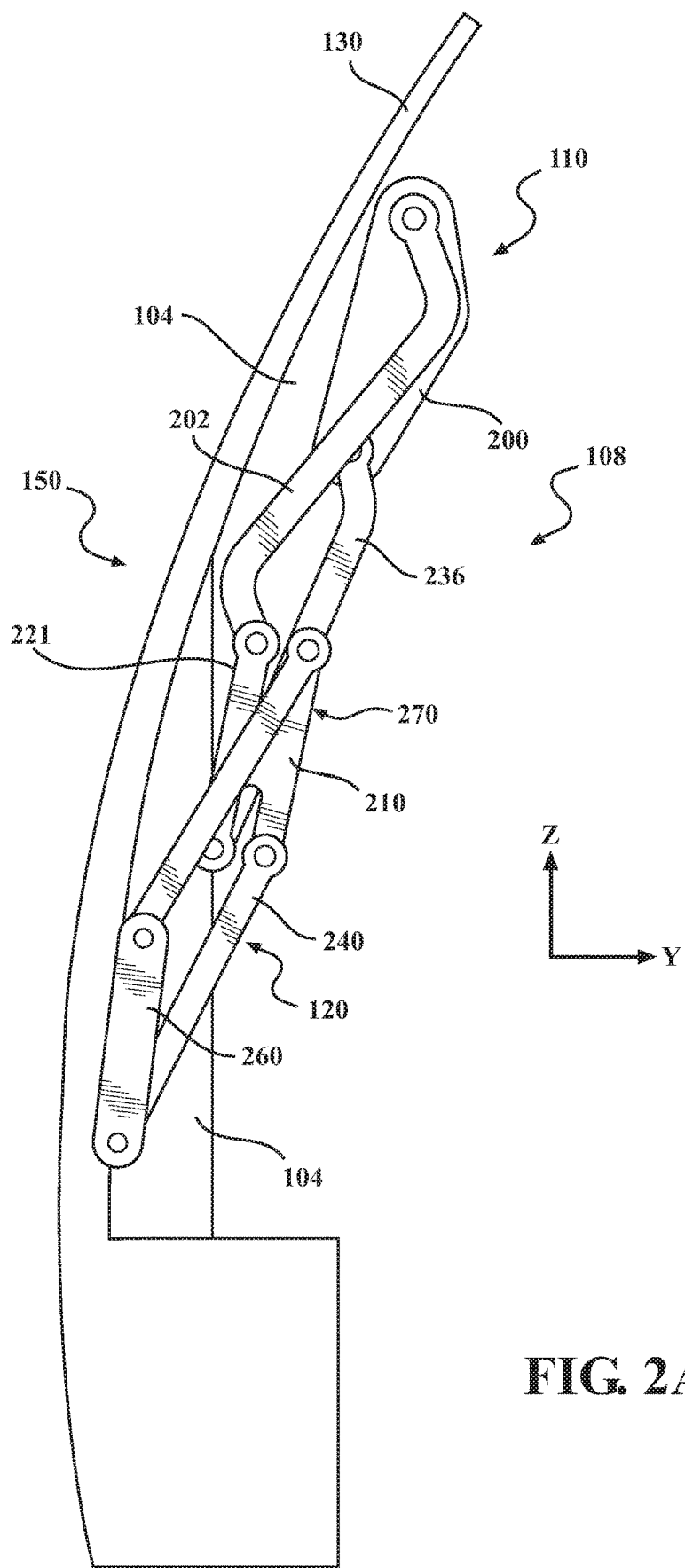
FIG. 2A is front view of an enlarged portion of FIG. 1A showing the door panel in a closed position.
Figure 2B:
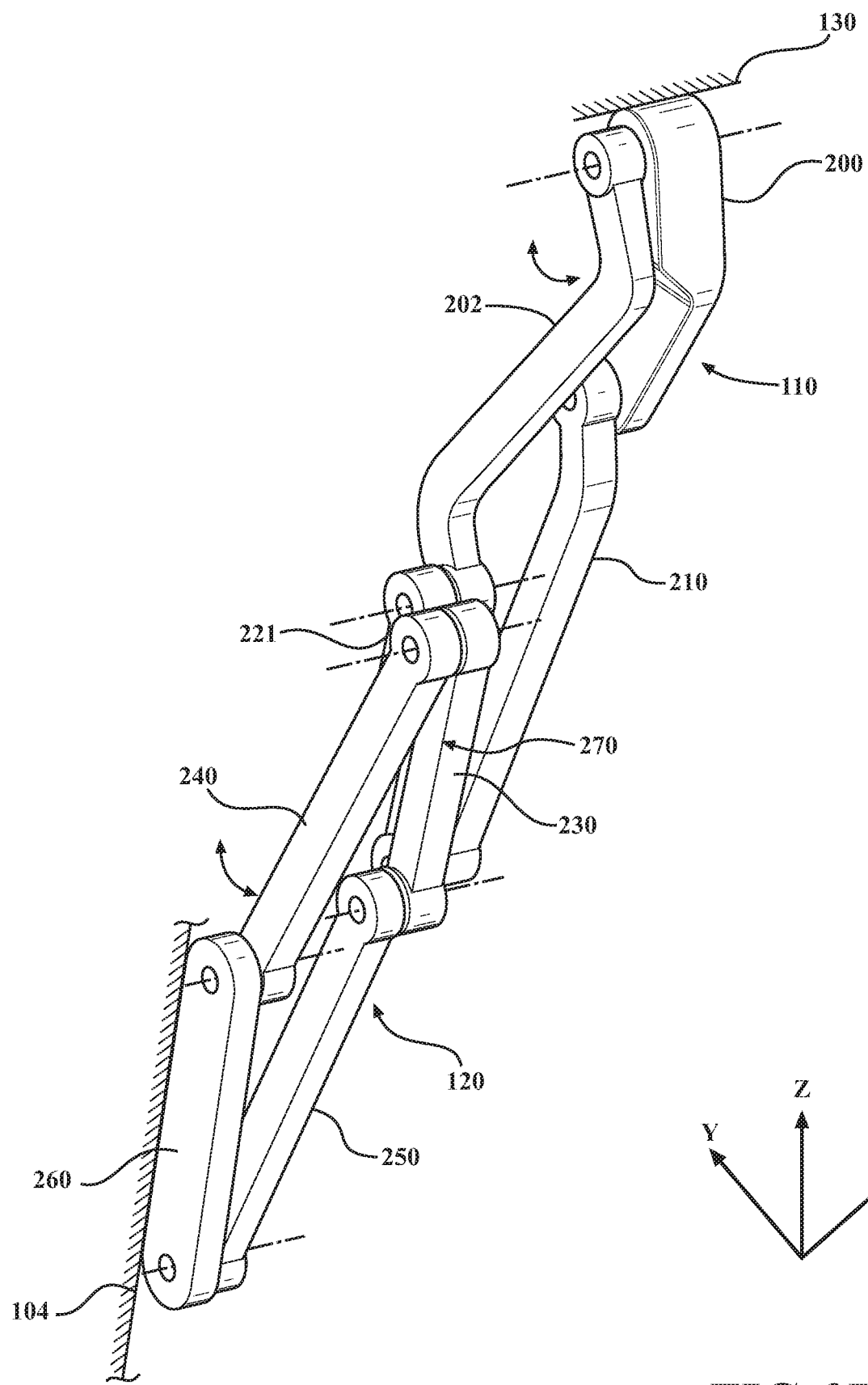
FIG. 2B is a cross-vehicle perspective view of FIG. 2A.
Figure 2C:
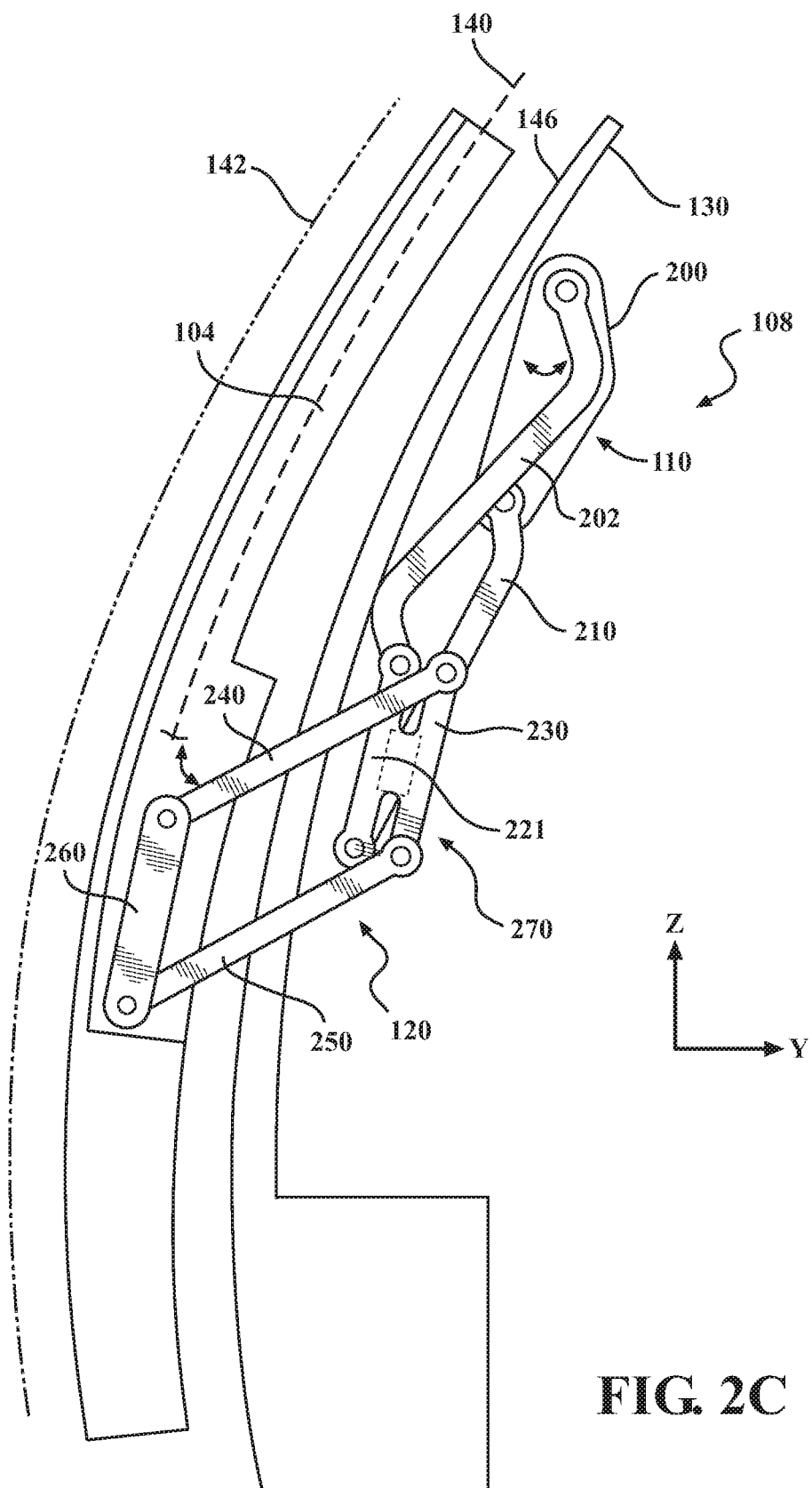
FIG. 2C is an alternate front view of FIG. 2A showing the door panel in a partially opened position.
Figure 2D:
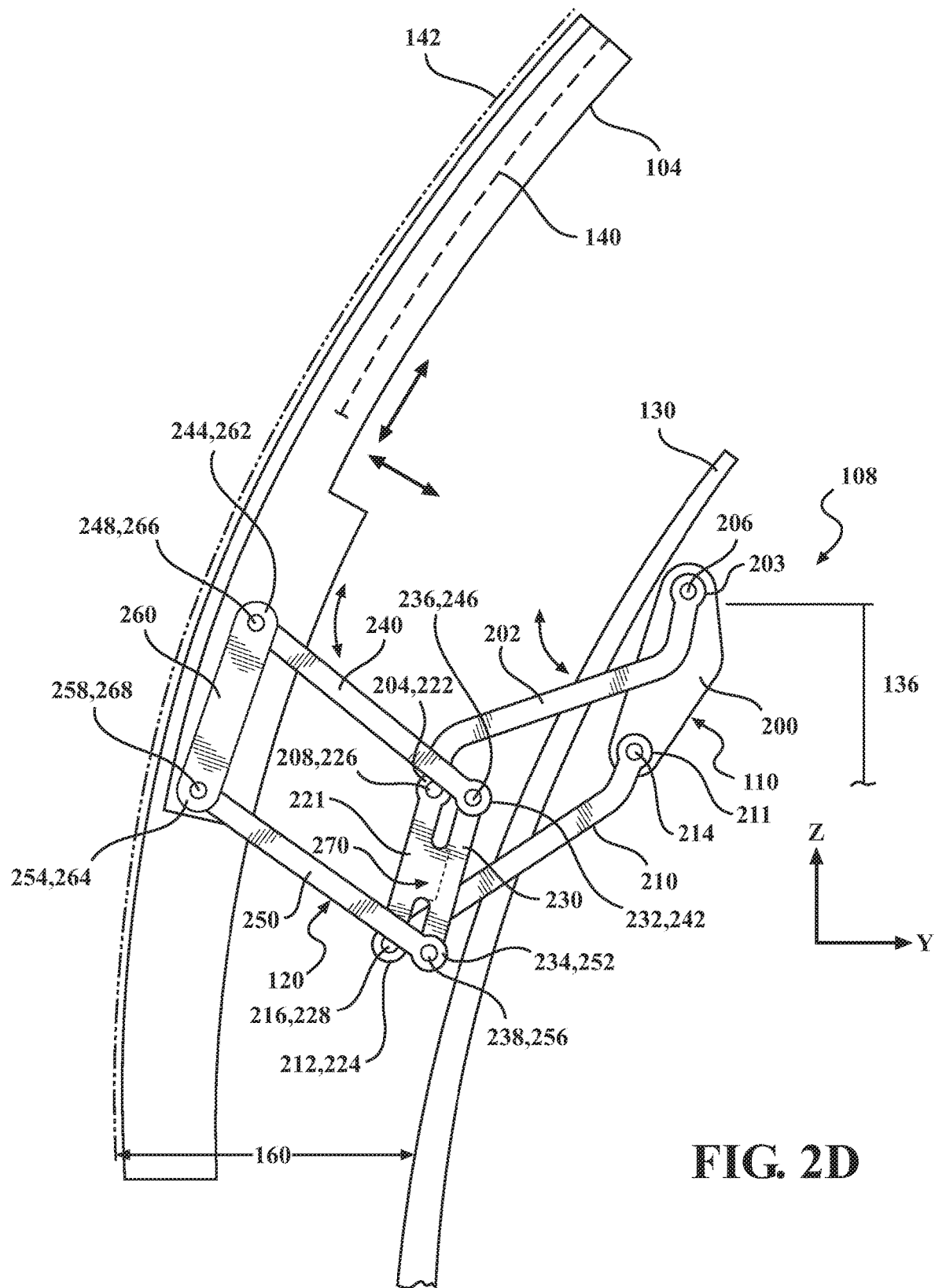
FIG. 2D is an alternate front view of FIG. 2B showing the door panel in a further opened position.
Figure 2E:
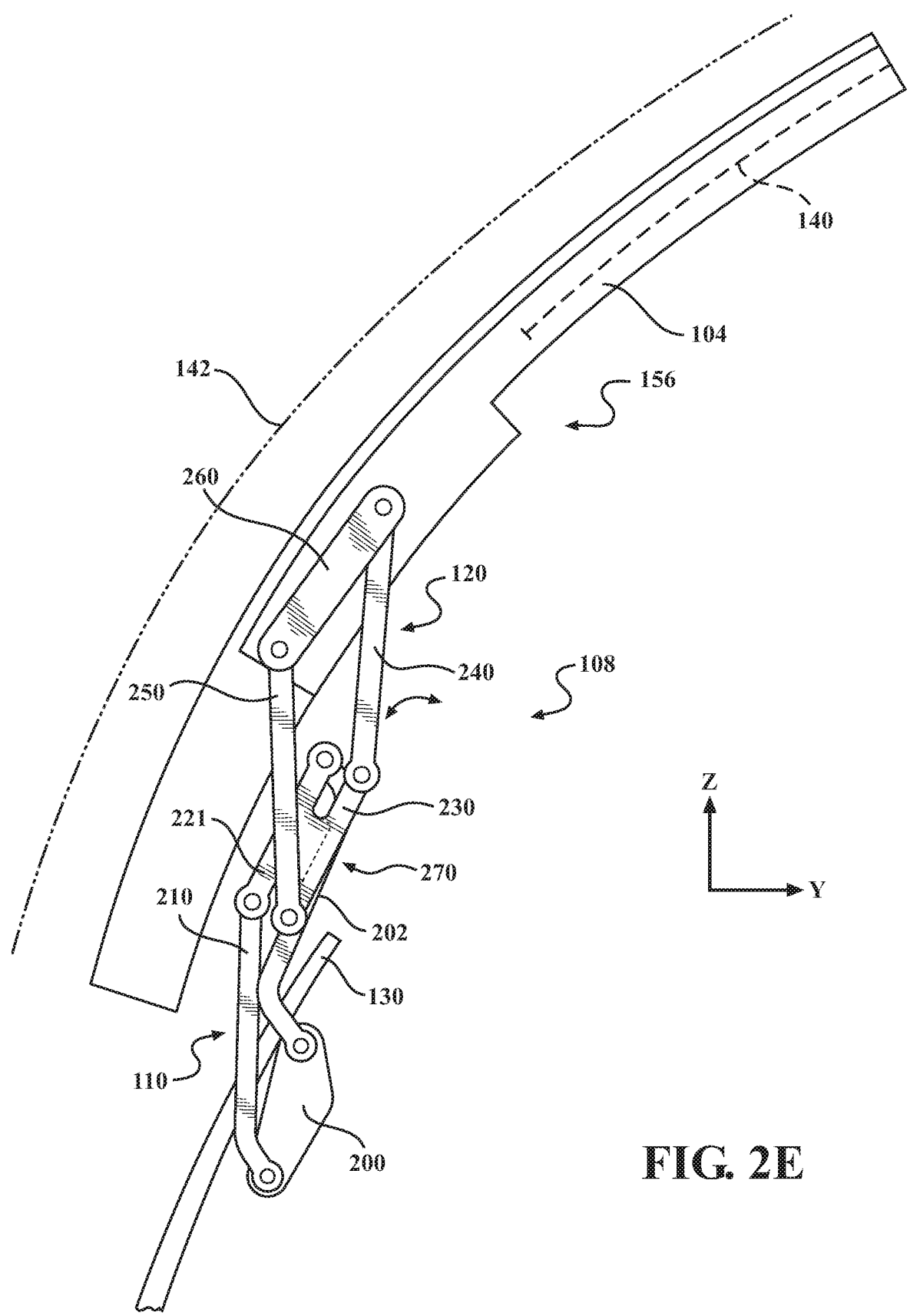
FIG. 2E is an alternate front view of FIG. 2D showing the door panel in a fully-opened position.

Referring to FIGS. 2A-2G, one aspect of door hinge 108 is shown. Door hinge 108 serves to move the first door panel 104 along a path of travel 140 in a movement envelope 142 between a closed position 150 and an open position 156 (i.e., a fully-open position). FIG. 2A shows the first door panel 104 in a closed position 150 where the first door panel 104 is sealed and secured to the door frame 130. FIG. 2C shows the first door panel 104 in a slightly open position, and FIG. 2D shows the first door panel 104 in a further open position. FIG. 2E illustrates the first door panel 104 in the open position 156.

As best seen in FIG. 2D, door hinge 108 includes the first four bar linkage 110. In the aspect illustrated, first four bar linkage 110 includes a mounting first link 200 which is rigidly connected to the door frame 130 above the door opening 136. The mounting first link 200 can be welded to the door frame 130 or secured with mechanical fasteners or other connecting methods and devices. First four bar linkage 110 further includes a second link 202 having a first end 203 and a second end 204. The second link 202 first end 203 is pivotally connected to the mounting first link 200 at a first pivot point 206 and the second end 204 includes a second pivot point 208.

First four bar linkage 110 further includes a third link 210 having a first end 211 and a second end 212. The third link 210 first end 211 is pivotally connected to the mounting first link 200 at a first pivot point 214 and the second end 212 includes a second pivot point 216. The first four bar linkage 110 further includes a fourth link 221 having first end 222, and a second end 224. The first end 222 of the fourth link 221 is pivotally connected to the second end 204 of the second link 202 at a first pivot point 226 and the second end 224 is pivotally connected to the second end 212 of the third link 210 at a second pivot point 228. As best seen in FIG. 2G, pivot point pairs 208, 226 and 216, 228 are respectively axially aligned. As shown in FIGS. 2B and 2G, mounting first link 200 may have an offset which positions the first four bar linkage second link first end 203 on a different geometric plane or elevation than the third link first end 211. Mounting first link 200 may be of different sizes, shapes and configurations to suit the particular application and required movement of the first four bar linkage 110 and the second four bar linkage 120.

In the aspect illustrated, the second four bar linkage 120 includes a first link 230 having a first end 232 and a second end 234. The first end 232 includes a first pivot point 236 and the second end 234 includes a second pivot point 238. The second four bar linkage 120 further includes a second link 240 having a first end 242 and a second end 244. The first end 242 of the second link 240 is pivotally connected to first end 232 of the first link 230 of the second four bar linkage 120 at a first pivot point 246 and the second end 244 includes a second pivot point 248.

The second four bar linkage 120 further includes a third link 250 having a first end 252 and a second end 254. The first end 252 of the third link 250 is pivotally connected to the second end 234 of the first link 230 of the second four bar linkage 120 at a first pivot point 256 and the second end 254 includes a second pivot point 258. The second four bar linkage 120 includes a fourth link 260 that is rigidly connected to the first door panel 104. The fourth link 260 includes a first end 262 and a second end 264. The first end 262 of the fourth link 260 is pivotally connected to the second end 244 of the second link 240 at a first pivot point 266, and the second end 264 is pivotally connected to the second end 254 of the third link 250 at a second pivot point 268. As best seen in FIG. 2G, the pivot point pairs 236,246 and 238,256 and 248,266 and 258,268 of the second four bar linkage 120 are respectively axially aligned.

In the aspect illustrated and best seen in FIG. 2G, the described implementations of the first four bar linkage 110 and the second four bar linkage 120 have links that are respectively secured through mechanical fasteners, for example fastening bolts having shoulders and wear bushings (not shown), allowing free rotation of the respectively pivotally connected links to one another. Alternate fasteners and methods for pivotally connecting the links may be used. The described links are made from steel, aluminum or other materials suitable for the performance specification and environmental conditions.

Figure 2F:
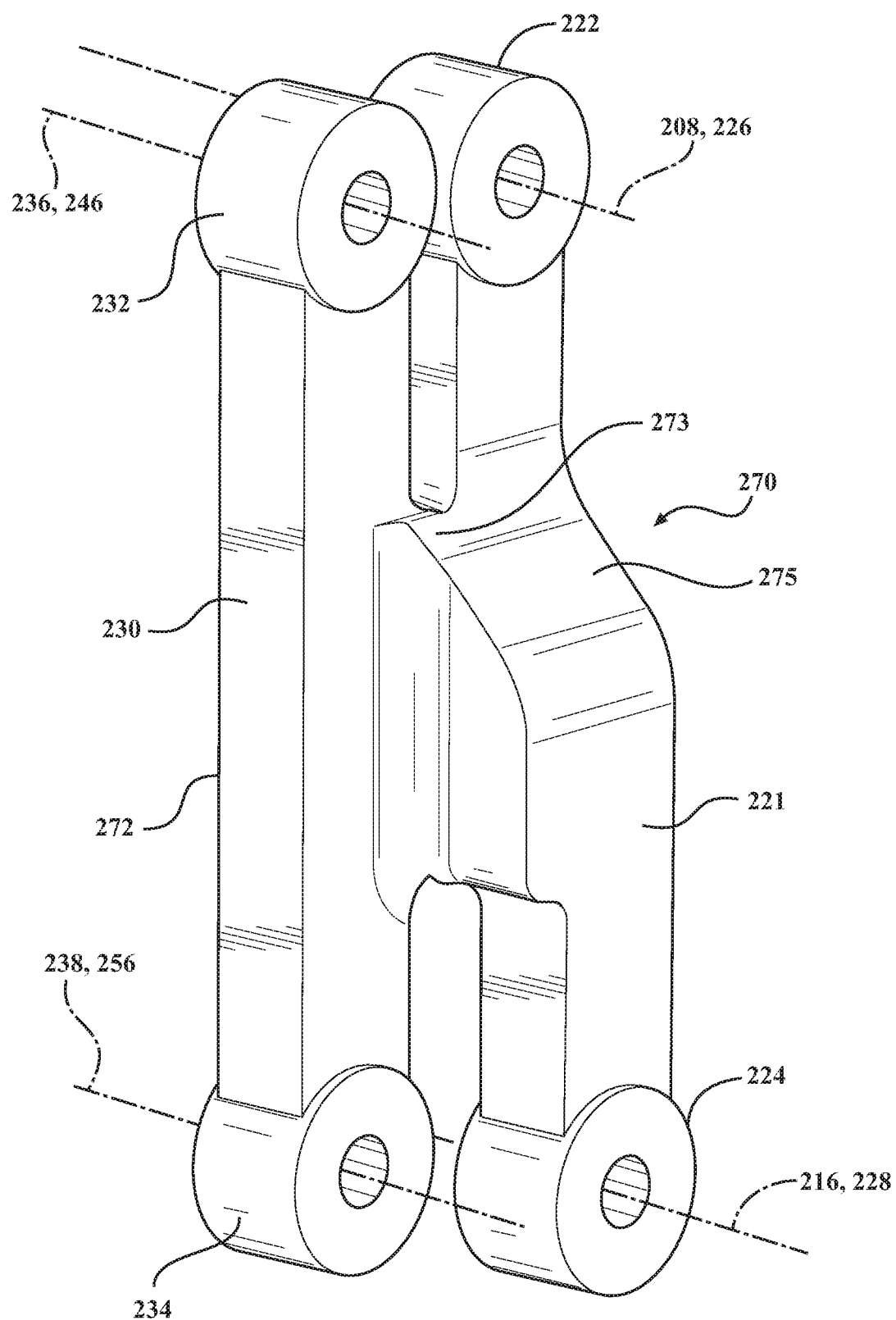
FIG. 2F is a rotated perspective view of the integrated coupler shown in FIGS. 2A-2E.
Figure 2G:
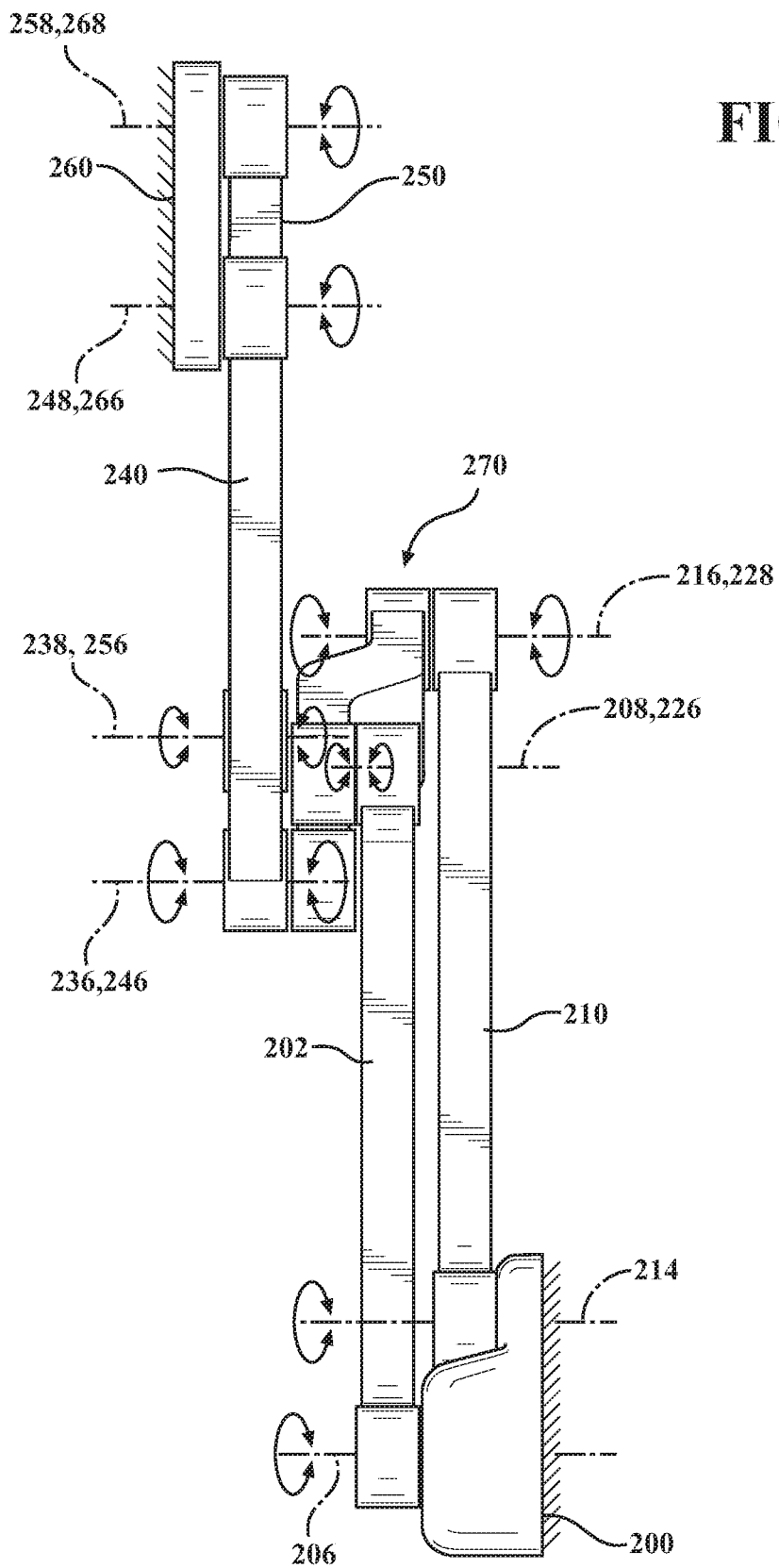
FIG. 2G is a partial top view of FIG. 2D.

As shown in FIGS. 2A-G, the door hinge 108 includes a coupler 270 used to connect the first four bar linkage 110 to the second four bar linkage 120. In the aspect as best seen in FIGS. 2B, 2F and 2G, coupler 270 includes a rigid bar 272 which integrates the first four bar linkage 110 fourth link 221, the second four bar linkage 120 first link 230, and a center portion 274 as a unitary piece. In other words, the integrated rigid bar 272 serves as both the first four bar linkage fourth link 221 and the second four bar linkage first link 230 in a single, unitary component. As best seen in FIGS. 2D, 2F and 2G. The rigid bar center portion 274 rigidly connects the first four bar linkage fourth link 221 to the second four bar linkage first link 230 preventing relative movement between the first four bar linkage fourth link 221 and the second four bar linkage first link 230.

In the illustrated aspect of rigid bar 272 in FIG. 2F, the first four bar linkage fourth link 221 includes an offset portion 275 used to position the fourth link second end 224 out a geometric plane of the first four bar linkage fourth link first end 222 and second four bar linkage first link 230 first end 232 and second end 234. Other sizes, shapes, lengths, configurations, and pivot points for rigid bar 272 may be used to suit the application, required movement of the first four bar linkage 110 and the second four bar linkage 120, the required first door panel 104 path of travel 140, the required movement envelope 142, and the performance specification, may be used.

Other devices and methods for rigid bar 272, for example not having an integrated first four bar linkage fourth link 221 and a second four bar linkage first link 230 may be used. For example, coupler 270 rigid bar 272 may be a separate member (not shown) from the first bar linkage fourth link 221 and the second four bar linkage first link 230 (shown integrated as described above). The coupler 270 separate rigid bar member may be pivotally connected to first link 230 and/or the fourth link 221 or may have sliding engagement through a shouldered fastener and a closed slot (not shown) allowing for relative movement between the rigid bar 272 and the respective connected link. Rigid bar 272 can alternately be connected to different links of the first four bar linkage 110 and the second four bar linkage 120.

The rigid bar 272 can be of other numbers of bars, and different sizes, shapes, lengths, and orientations other than rigid bar 272 as shown. Further, although shown as a separate component or member, rigid bar 272 can be integral and unitary with one or both first four bar linkage 110 and/or second four bar linkage 120.

Figure 3A:
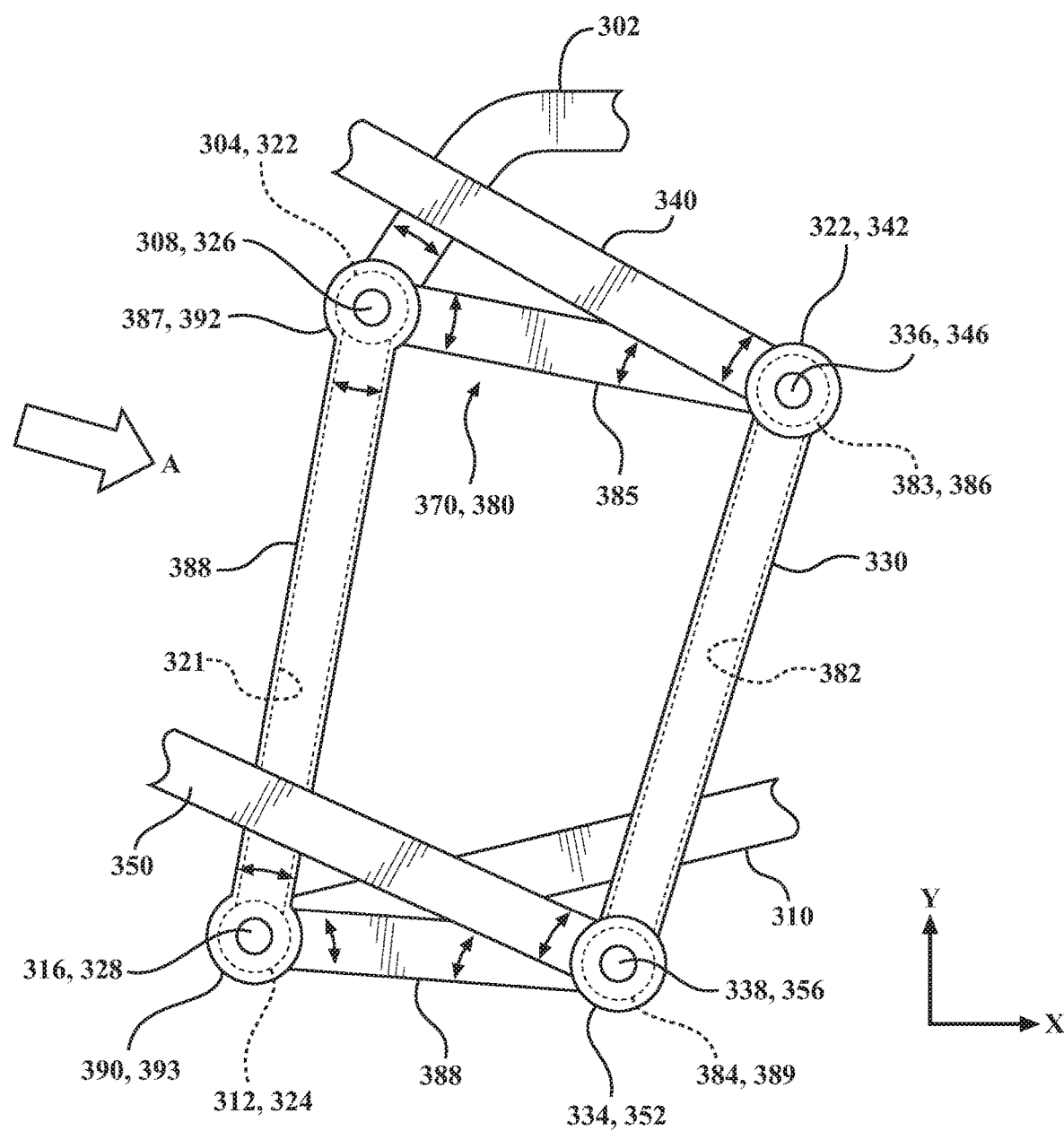
FIG. 3A is a front view of an alternate embodiment of the coupler shown in FIG. 2D.
Figure 3B:
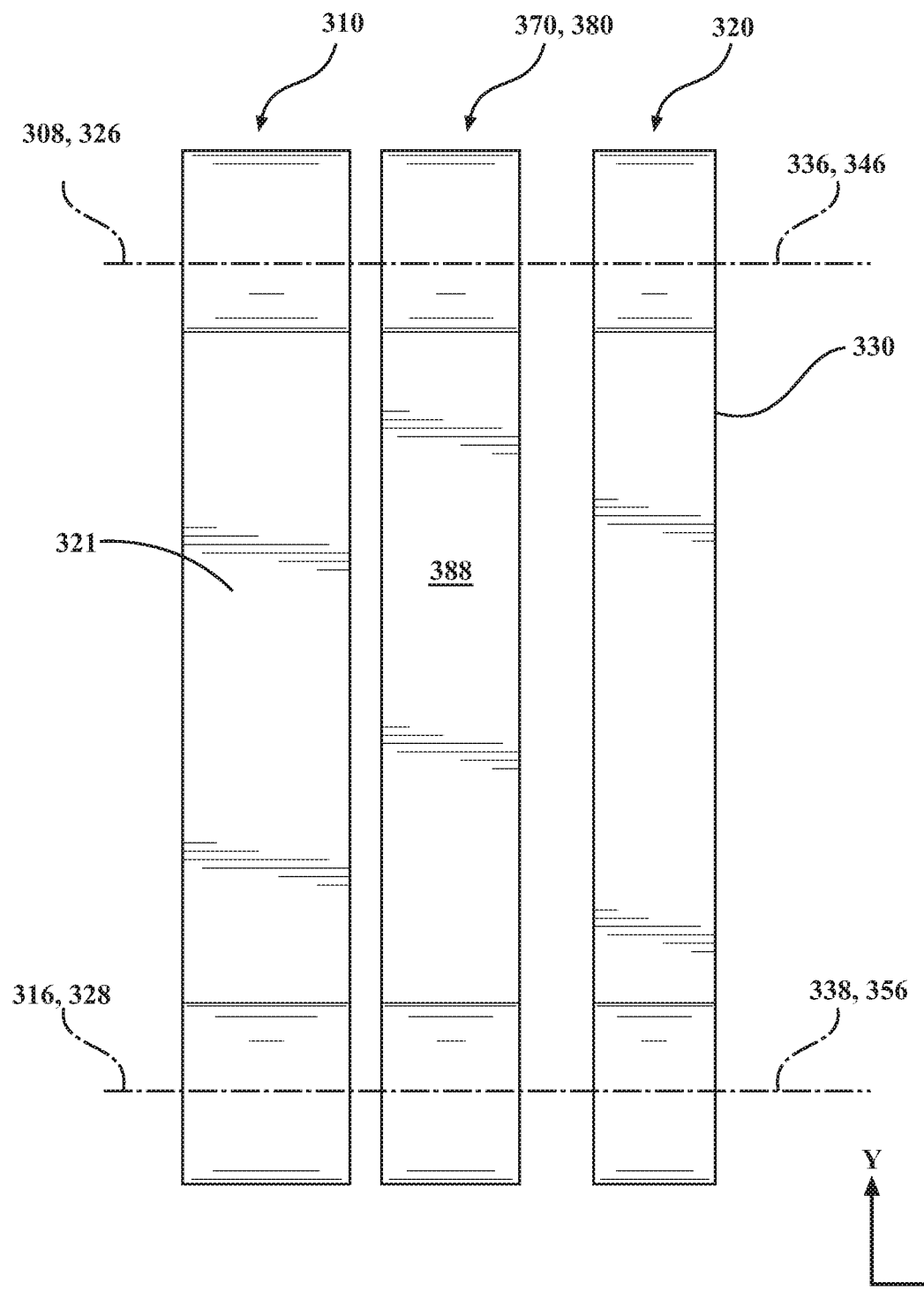
FIG. 3B is a simplified schematic side view of FIG. 3A taken in the direction of A.

Referring to FIGS. 3A and 3B an alternate aspect of coupler 270 is shown in the form of a coupler 370. The coupler 370 includes a third four bar linkage 380. The third four bar linkage 380 is positioned between, and respectively connected to, a first four bar linkage 310 (as previously described with respect to the first four bar linkage 110) and a second four bar linkage 320 (as previously described with respect to the second four bar linkage 120) (spaces shown between the first four bar linkage 310, the second four bar linkage 320, and the third four bar linkage 380 in FIG. 3B for convenience of illustration only). In the example, the third four bar linkage 380 of the coupler 370 includes a first link 382 having a first end 383 and a second end 384. The first link 382 is pivotally connected at the first end 383 to the second four bar linkage 320 at pivot points 336, 346 (previously described as 236, 246). First link 382 is pivotally connected at the second end 384 to the second four bar linkage 320 at pivot points 338, 356 (previously described as 238, 256).

The third four bar linkage 380 of the coupler 370 includes a second link 385 having a first end 386 and a second end 387. First end 386 is pivotally connected to the first end 386 to the second four bar linkage 320 at pivot points 336, 346 and at the second end 387 to first four bar linkage 310 at pivot points 308, 326 (previously described as 208, 226). The third four bar linkage 380 of the coupler 370 further includes a third link 388 having a first end 389 and a second end 390. First end 389 is pivotally connected to the second four bar linkage 320 at pivot points 338, 356 and the second end 390 is pivotally connected to first four bar linkage 310 at pivot points 316, 328 (previously described as 216, 228).

The third four bar linkage 380 of the coupler 370 includes a fourth link 391 having a first end 392 and a second end 393. First end 392 is pivotally connected to first four bar linkage 310 at pivot points 308, 326 and the second end 393 is pivotally connected to the first four bar linkage 310 at pivot points 316, 328.

As best seen in the aspect illustrated in FIGS. 2B and 2D, first four bar linkage 110 second link 202 and third link 210 are shaped or curved relative to the mounting first link 200 to position the fourth link 221 further outboard (further away from) from the door frame 130 than the second four bar linkage 120 first link 230 in the y-coordinate direction. This positioning provides an "overlap" of the first four bar linkage 110 and the second four bar linkage 120 throughout the path of travel 140 of the first door panel 104. This allows the door hinge 108 to be more compact or space efficient while maintaining significant rotation and lift of the first door panel 104 in implementations in which the movement envelope 142 is narrow. The illustrated shape or curvature of the first four bar linkage 110 second link 202 and third link 210 further provides that the first four bar linkage 110 and the second four bar linkage 120 are not fully extended along the y-coordinate direction at the same time along the path of travel 140. That is, neither the first four bar linkage 110 nor the second four bar linkage 120 have their maximum length or extension in the y-coordinate direction at the same time. This is beneficial to achieve a narrower movement envelope 142 distance 160 from the exterior surface 146. Alternative sizes, shapes, lengths, configurations, pivot point locations, and relative movement of the described links relative to one another, as well as to the door frame 130 and first door panel 104, may be used.

Referring to FIGS. 2A-2G, one aspect of a manually-operated implementation of the multi-linkage vehicle door hinge system 100 (where electric motors are not used), includes a door effort reduction device to reduce the effort a user must exert to open and/or close the first door panel 104. In one aspect, one or more counterweights (not shown) are used to offset the gravitational forces needed to lift the first door panel 104 from the closed position 150 to the open position 156. Alternate aspects may include internal force biasing devices, for example springs or pneumatic cylinders, which are biased to lift the first door panel 104 when the first door panel 104 is disengaged from the door frame 130 from the closed position 150. The door effort reduction device, or devices, can be positioned at predetermined structural points in door hinge 108, for example in the mounting first link 200 or at one or more of the link pivot points. Equally, door effort reduction devices can be used to assist a user in closing the first door panel 104, for example to slow and/or control the speed of the first door panel 104 moving from the open position 156 to the closed position 150. These door effort reduction devices may further be used for electrically-powered or automatic door panels are used (where electric motors assist in opening and closing the door panel).

In operation, multi-linkage vehicle door hinge system 100 is typically in a closed position 150 as shown in FIGS. 1A and 2A wherein the first door panel 104 is engaged with the door frame 130 and any weather seals surrounding the door opening 136. A user manipulates a door actuator, for example a door handle, which disengages a door latch from a striker plate (not shown). In implementations in which the multi-linkage vehicle door hinge system 100 is manually operated, door effort reduction devices assist a user in raising the first door panel between the closed position 150 and the open position 156. In implementations in which the multi-linkage vehicle door hinge system 100 is power operated, one or more electric motors apply force to the door hinge 108 through one or both first four bar linkage 110 and/or the second four bar linkage 120 to move the first door panel 104 from the closed position 150 to the open position 156 and back again.

In motion between the first door panel 104 closed position 150 and the open position 156, the first four bar linkage 110, the second four bar linkage 120, and the coupler 270 articulate as described and illustrated in FIGS. 2A-2G to move the first door panel 104 from the closed position 150 to the open position 156 along the door panel path of travel 140. The first door panel 104 moves within the movement envelope 142 which is substantially parallel to the exterior surface 146. In an alternate aspect, the first door panel 104 is further rotated toward the centerline 186 to a folded down position 180 as shown in FIG. 1C. In the first door panel 104 open position, substantially all of the door opening 136 is clear for passage to enter or exit the vehicle passenger cabin. The first door panel 104 is selectively moved from the open position 156 to the closed position 150 in a reverse manner.

Figure 4:
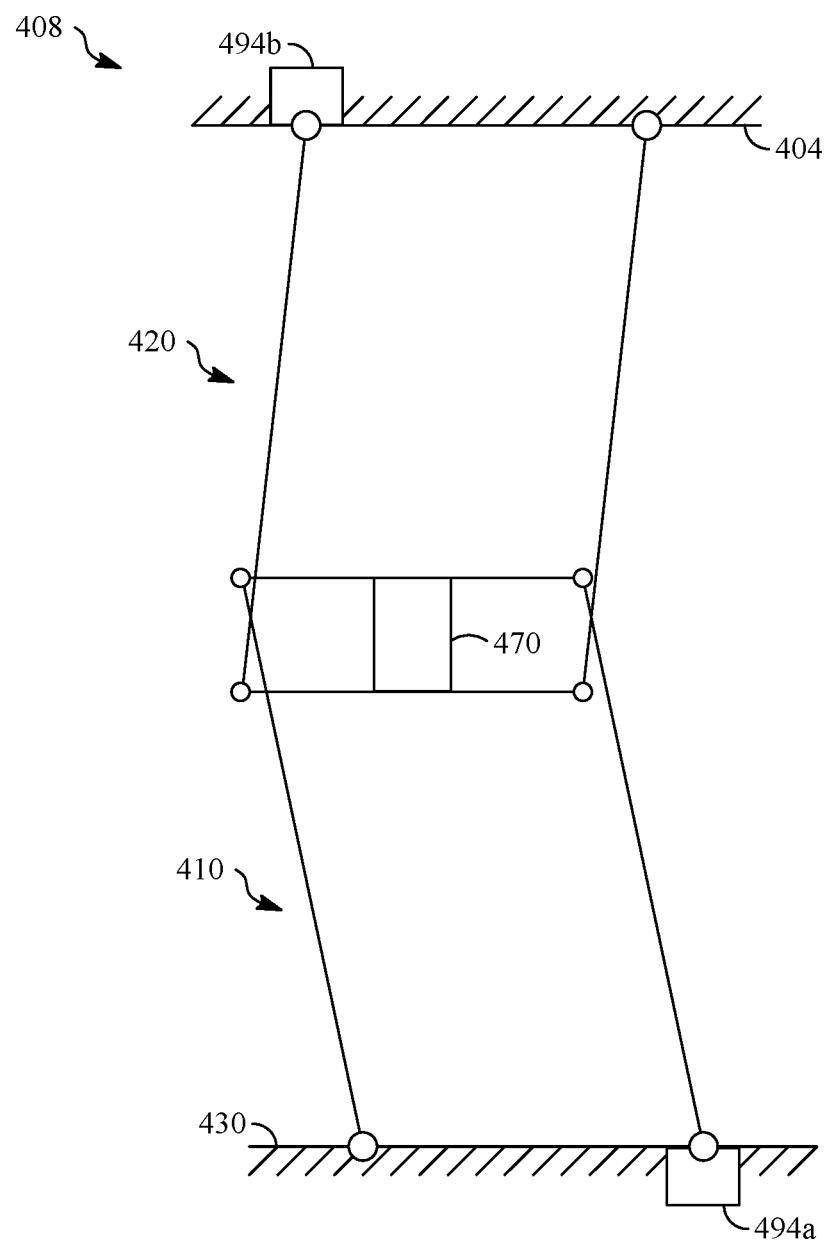
FIG. 4 is a simplified schematic side view showing a multi-linkage vehicle door hinge including an actuation system according to a first example.

FIG. 4 is a simplified schematic side view showing a door hinge 408 including an actuation system according to a first example. The door hinge 408 is a multi-linkage vehicle door hinge, having components that are analogous to those described with respect to the door hinge 108 except as otherwise described herein.

The door hinge 408 connects a door panel 404 to door frame 430 using a first four bar linkage 410 and a second four bar linkage 420. The first four bar linkage 410 and the second four bar linkage 420 may be configured according to the description of the first four bar linkage 110 and the second four bar linkage 120, including links, pivot points, and a coupling structure that connects the first four bar linkage 410 to the second four bar linkage 420, which in the illustrated example is a coupler 470 in the form of a bar that rigidly connects one of the links of the first four bar linkage 410 to one of the links of the second four bar linkage 420.

The actuation system for the door hinge 408 includes a first electric motor 494a and a second electric motor 494b. The first electric motor 494a is connected to the door frame 430 and can be packaged in the vehicle body (not shown in FIG. 4). The first electric motor 494a is operable to apply a rotational force to one of the links of the first four bar linkage 410, for example, at the location of a pivotal connection to the door frame 430. The second electric motor 494b is connected to the door panel 404 and can be packaged in the vehicle body (not shown in FIG. 4). The second electric motor 494b is operable to apply a rotational force to one of the links of the second four bar linkage 420, for example, at the location of a pivotal connection to the door frame 430. By independent control of the first electric motor 494a and the second electric motor 494b, motion of the door panel 404 can be controlled including adjustment of the movement envelope during travel between open and closed positions.

Figure 5:
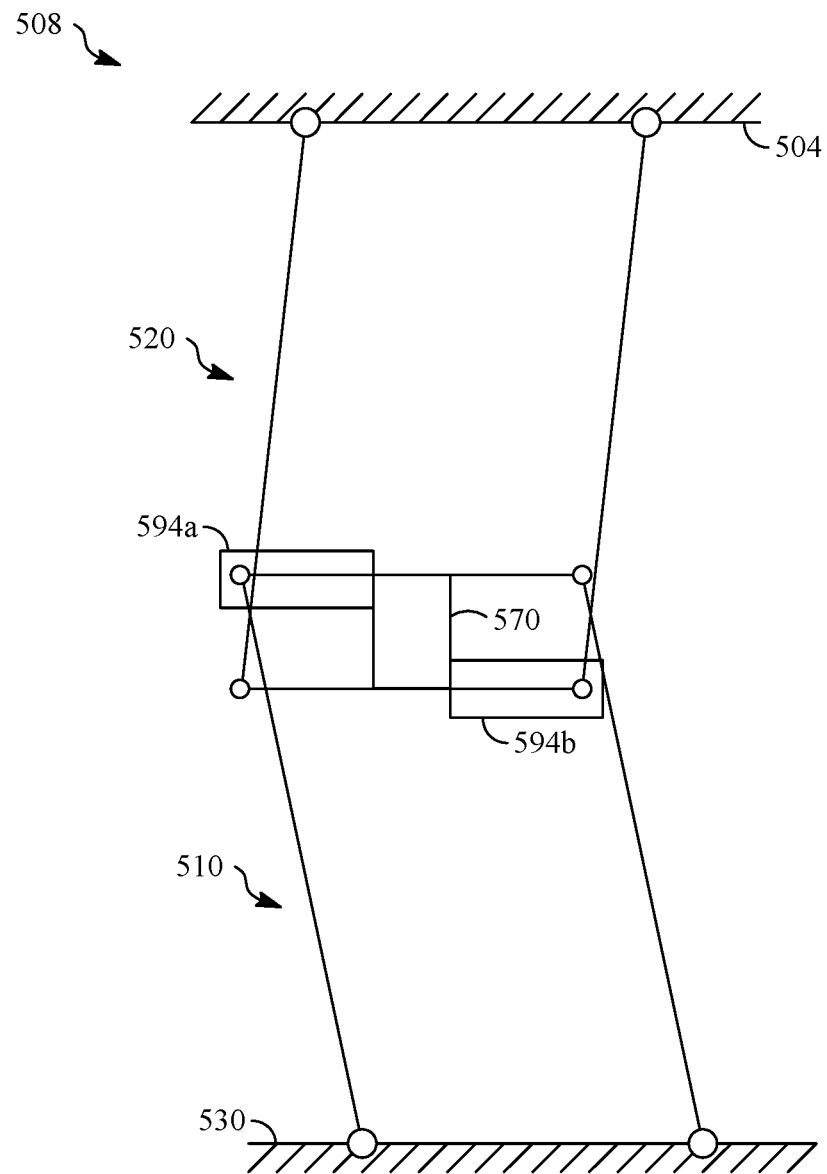
FIG. 5 is a simplified schematic side view showing a multi-linkage vehicle door hinge including an actuation system according to a second example.

FIG. 5 is a simplified schematic side view showing a door hinge 508 including an actuation system according to a second example. The door hinge 508 is a multi-linkage vehicle door hinge, having components that are analogous to those described with respect to the door hinge 108 except as otherwise described herein.

The door hinge 508 connects a door panel 504 to door frame 530 using a first four bar linkage 510 and a second four bar linkage 520. The first four bar linkage 510 and the second four bar linkage 520 may be configured according to the description of the first four bar linkage 110 and the second four bar linkage 120, including links, pivot points, and a coupling structure that connects the first four bar linkage 510 to the second four bar linkage 520, which in the illustrated example is a coupler 570 in the form of a bar that rigidly connects one of the links of the first four bar linkage 510 to one of the links of the second four bar linkage 520.

The actuation system for the door hinge 508 includes a first electric motor 594a and a second electric motor 594b. The first electric motor 594a is connected to the coupler 570. The first electric motor 594a is operable to apply a rotational force to one of the links of the first four bar linkage 510, for example, at the location of a pivotal connection adjacent to the coupler 570. The second electric motor 594b is connected to the coupler 570. The second electric motor 594b is operable to apply a rotational force to one of the links of the second four bar linkage 520, for example, at the location of a pivotal connection adjacent to the coupler 570. By independent control of the first electric motor 594a and the second electric motor 594b, motion of the door panel 504 can be controlled including adjustment of the movement envelope during travel between open and closed positions.

Figure 6:
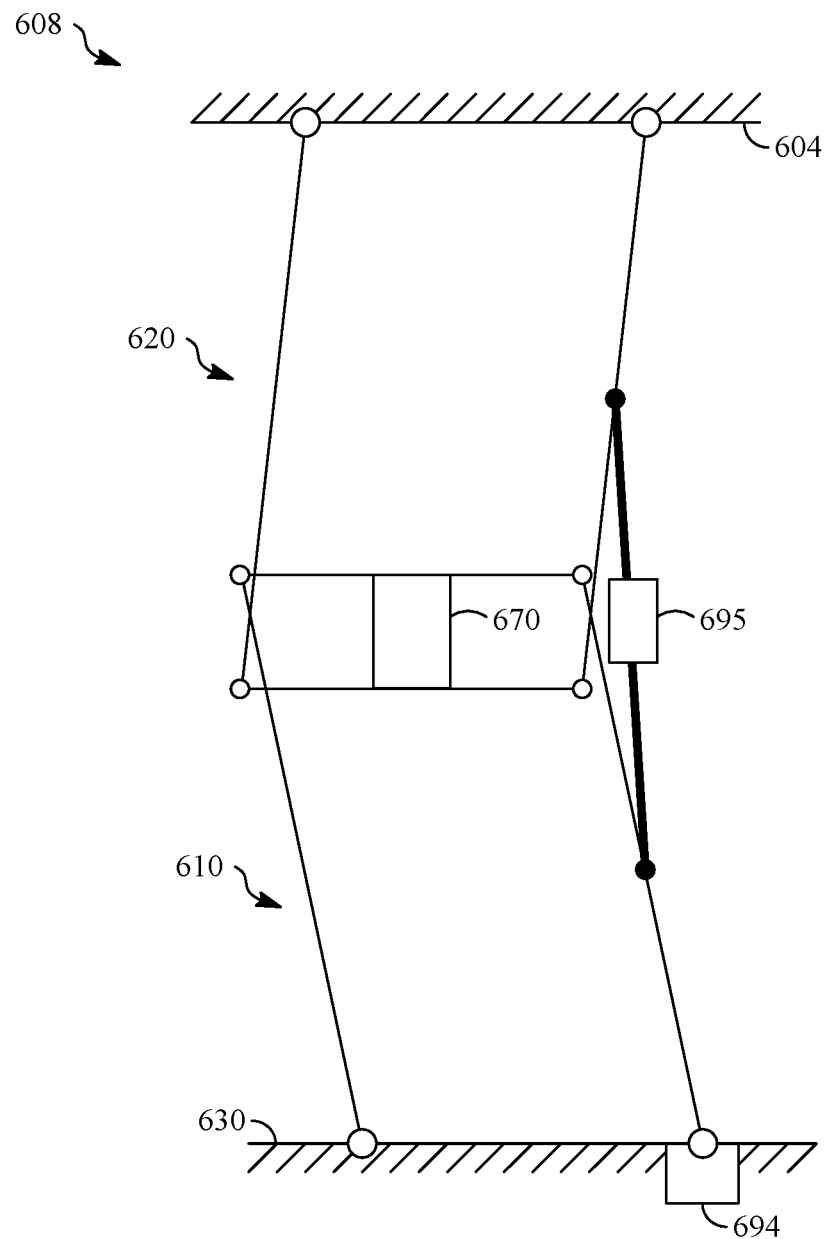
FIG. 6 is a simplified schematic side view showing a multi-linkage vehicle door hinge including an actuation system according to a second example.

FIG. 6 is a simplified schematic side view showing a door hinge 608 including an actuation system according to a third example. The door hinge 608 is a multi-linkage vehicle door hinge, having components that are analogous to those described with respect to the door hinge 108 except as otherwise described herein.

The door hinge 608 connects a door panel 604 to door frame 630 using a first four bar linkage 610 and a second four bar linkage 620. The first four bar linkage 610 and the second four bar linkage 620 may be configured according to the description of the first four bar linkage 110 and the second four bar linkage 120, including links, pivot points, and a coupling structure that connects the first four bar linkage 610 to the second four bar linkage 620, which in the illustrated example is a coupler 670 in the form of a bar that rigidly connects one of the links of the first four bar linkage 610 to one of the links of the second four bar linkage 620.

The actuation system for the door hinge 608 includes an electric motor 694 and a motion transfer assembly 695. The electric motor 694 is connected to the door frame 630 and packaged in the vehicle body as illustrated but could alternatively be connected and packaged in the door panel 604. The motion transfer assembly 695 interconnects one of the links of the first four bar linkage 610 to one of the links of the second four bar linkage 620 to cause pivotal motion of links of the second four bar linkage 620 in response to pivotal motion of the links of the first four bar linkage 610. The motion transfer assembly 695 is operable to vary the rate of motion of the second four bar linkage 620 relative to the first four bar linkage 610. As one example, the motion transfer assembly 695 may include a linear actuator, as another example, the motion transfer assembly 695 may be a bar having a controllable sliding connection relative to the links of one or both of the first four bar linkage 610 or the second four bar linkage 620, as another example, the motion transfer assembly 695 may include a cable and pulley system that is passively actuated based on linkage motion, actively actuated using a motor and controller, or actuated actively in response to sensed linkage motion.

Figure 7:
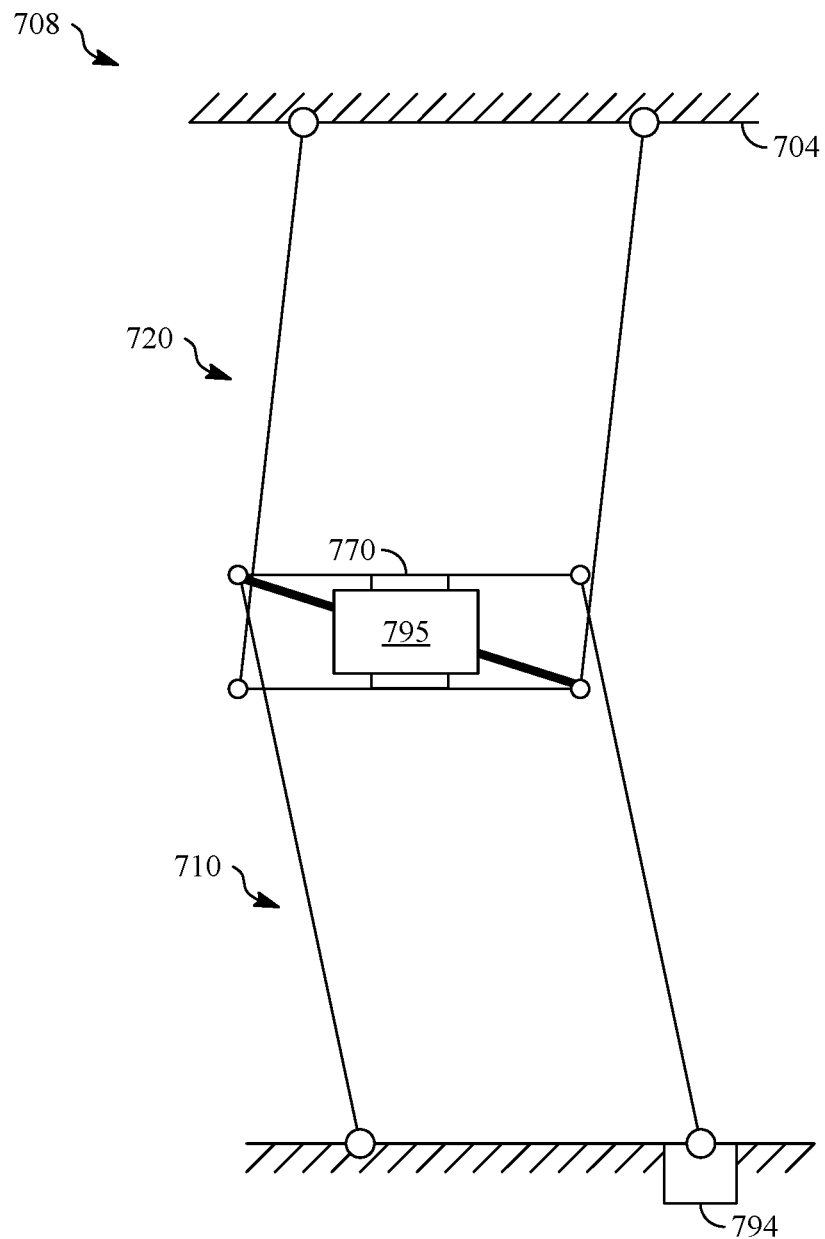
FIG. 7 is a simplified schematic side view showing a multi-linkage vehicle door hinge including an actuation system according to a second example.

FIG. 7 is a simplified schematic side view showing a door hinge 708 including an actuation system according to a fourth example. The door hinge 708 is a multi-linkage vehicle door hinge, having components that are analogous to those described with respect to the door hinge 108 except as otherwise described herein.

The door hinge 708 connects a door panel 704 to door frame 730 using a first four bar linkage 710 and a second four bar linkage 720. The first four bar linkage 710 and the second four bar linkage 720 may be configured according to the description of the first four bar linkage 110 and the second four bar linkage 120, including links, pivot points, and a coupling structure that connects the first four bar linkage 710 to the second four bar linkage 720, which in the illustrated example is a coupler 770 in the form of a bar that rigidly connects one of the links of the first four bar linkage 710 to one of the links of the second four bar linkage 720.

The actuation system for the door hinge 708 includes an electric motor 794 and a motion transfer assembly 795. The electric motor 794 is connected to the door frame 730 and packaged in the vehicle body as illustrated but could alternatively be connected and packaged in the door panel 704. The motion transfer assembly 795 is connected to the coupler 770 and interconnects one of the pivots first four bar linkage 710 to one of the pivots of the second four bar linkage 720 to cause pivotal motion of links of the second four bar linkage 720 in response to pivotal motion of the links of the first four bar linkage 710.

The motion transfer assembly 795 is operable to vary the rate of motion of the second four bar linkage 720 relative to the first four bar linkage 710. As one example, the motion transfer assembly 795 may include a gear train having gears, and the gear train may be configured to generate a variable output rotation in response to an input rotation. As another example, the motion transfer assembly may include cams that are operable to transfer motion according to a desired profile according to the geometric configuration of the cams.

Thus, the motion transfer assembly 795 may include a first gear or cam connected to the first four bar linkage and a second gear or cam connected to the second four bar linkage, wherein the second gear or cam engaged with the first gear or cam, either by direct engagement, or by indirect engagement through intervening structures. In one example, the motion transfer assembly 795 includes a continuously variable transmission that applies a variable drive ratio to the output rotation in response to the input rotation under mechanical or electronic control.

Referring to FIGS. 8A-8D an alternate aspect of a multi-linkage vehicle door hinge system 800 is illustrated. In the aspect, door hinge 808 is a six-bar (or link) door hinge used to move a first door panel 804 between a closed position 850 shown in FIG. 8A to an open position 856 (i.e., a fully-open position) shown in FIG. 8C along a path of travel 840. As previously generally described for first door panel 104, first door panel 804 moves through a movement envelope 842 (outboard side shown in phantom line) between the closed position and the open position. Due to the different geometry and articulation of the door hinge 808, the path of travel 840 and movement envelope 842 will vary from the first door hinge 108 previously described. As described for door hinge 108, only one door hinge 808 is described and illustrated. Additional door hinges 808 may be used on the same first door panel 804, and/or additional door panels or other panels, as previously described for multi-linkage vehicle door system 100.

Figure 8A:
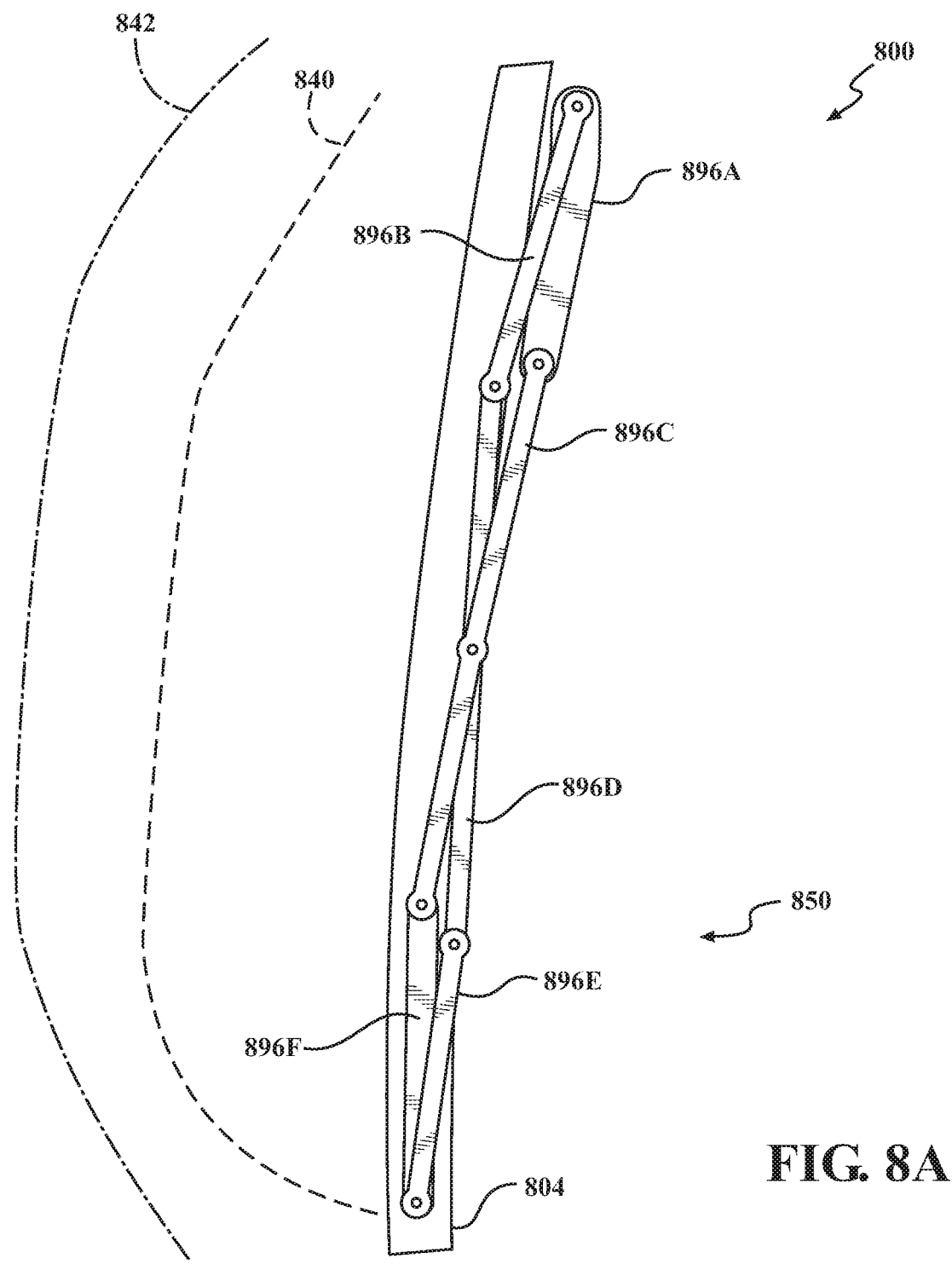
FIG. 8A is a is front view of a multi-linkage vehicle door hinge showing the door panel in a closed position.
Figure 8B:
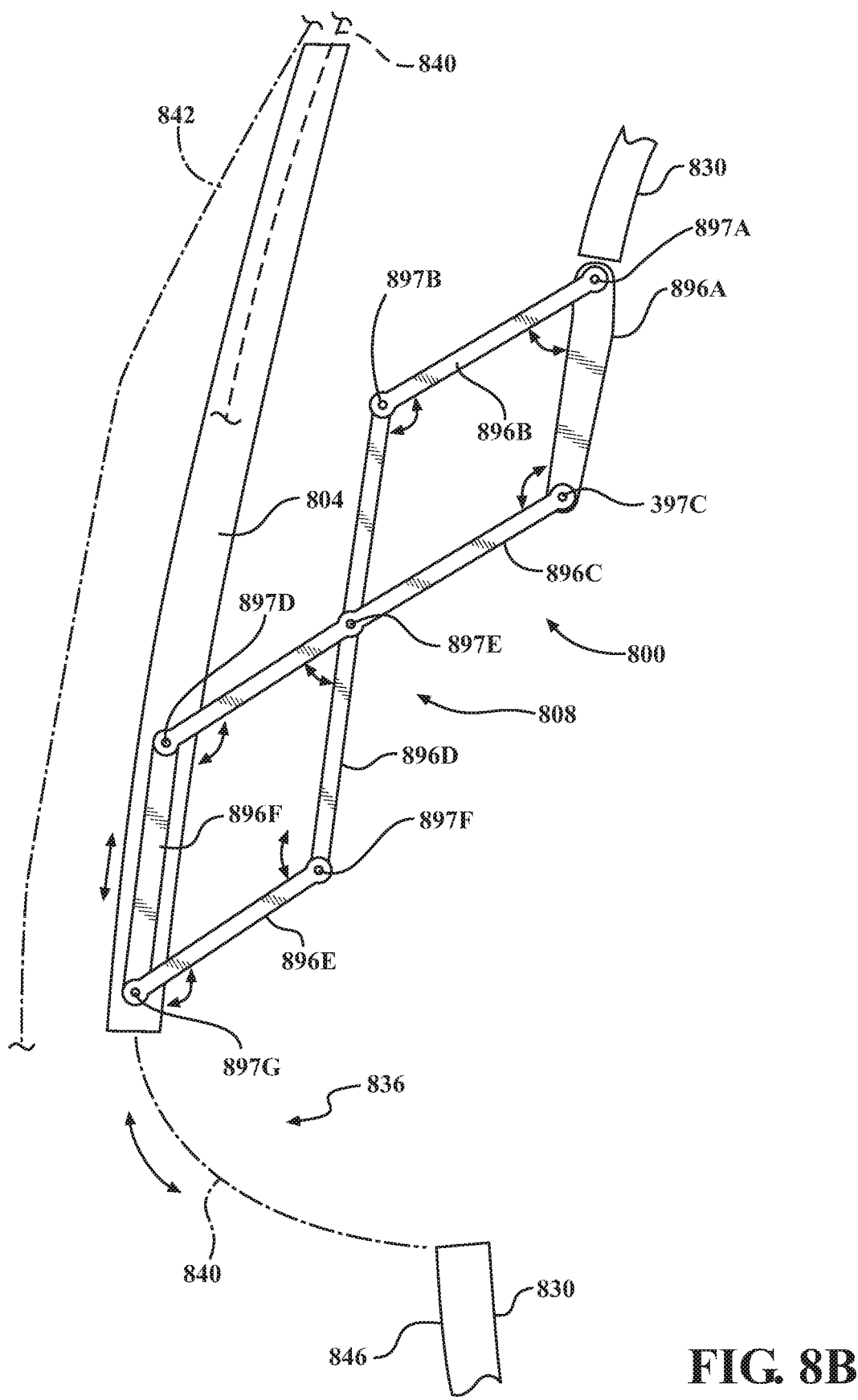
FIG. 8B is an alternate front view of FIG. 8A showing the door panel in a partially opened position.
Figure 8C:
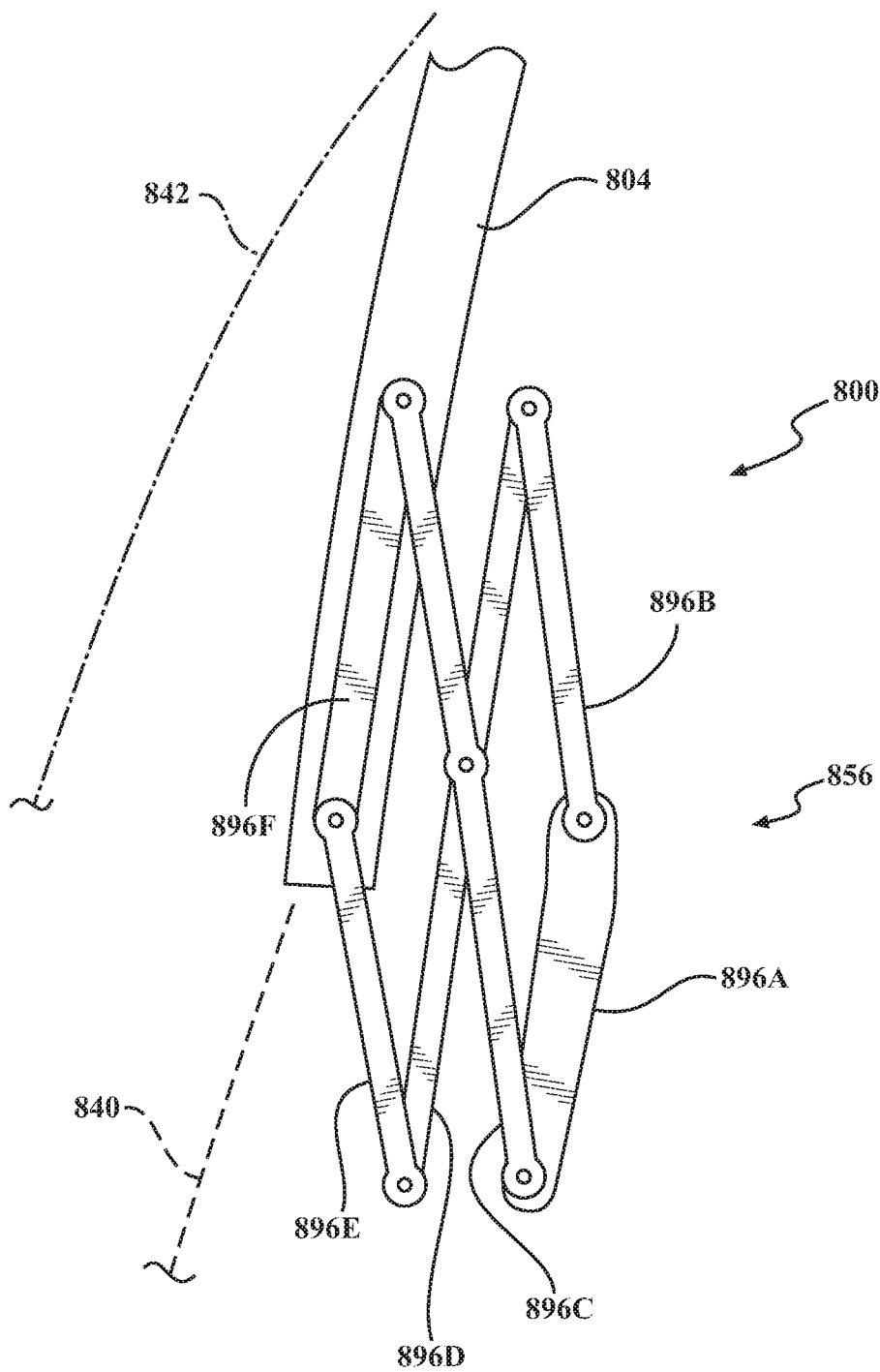
FIG. 8C is an alternate front view of FIG. 8B showing the door panel in a fully-opened position.
Figure 8D:
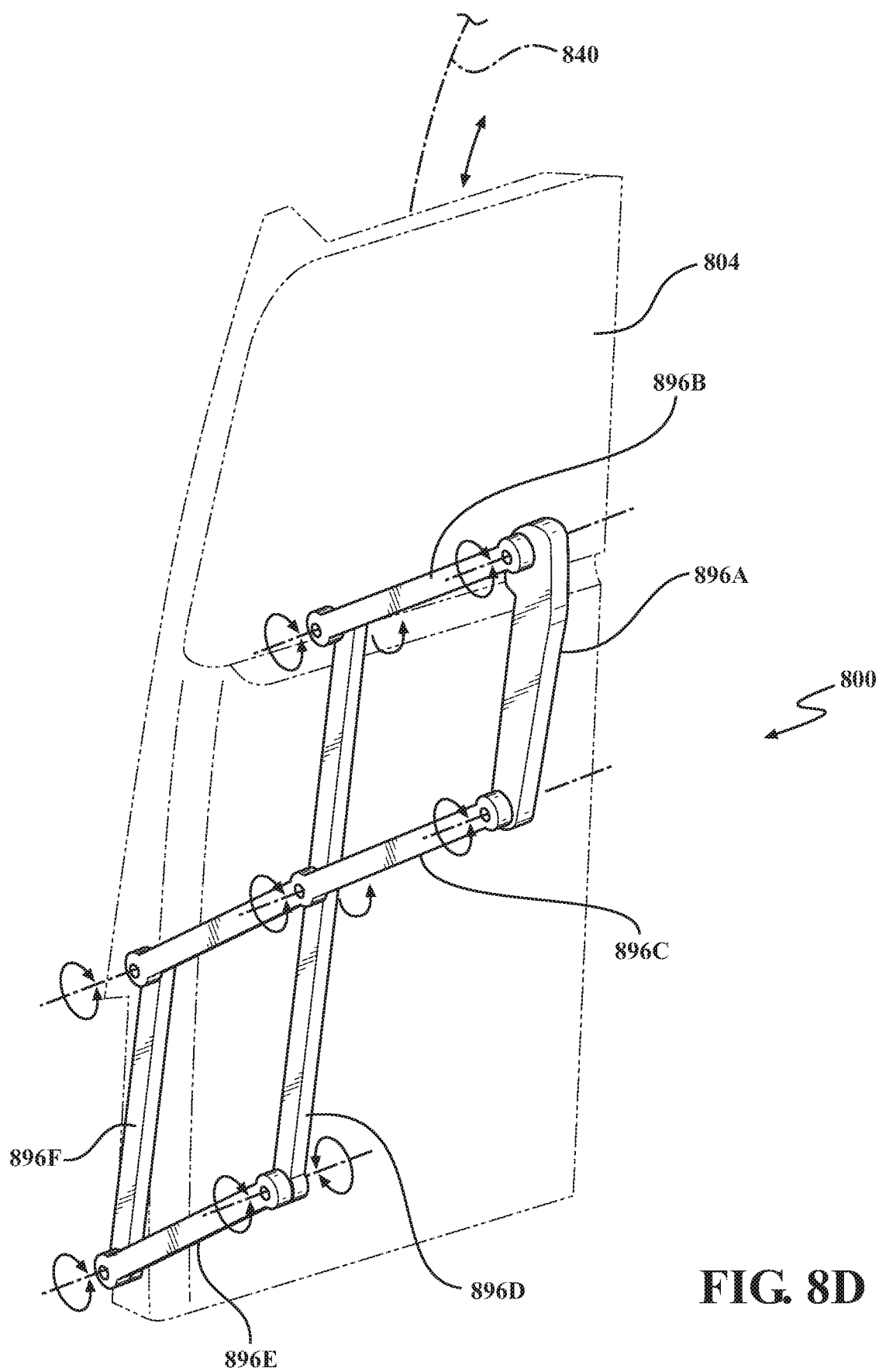
FIG. 8D is a cross-vehicle perspective view of the vehicle door hinge shown in FIG. 8B.

In the aspect as best seen in FIGS. 8B and 8D, door hinge 808 includes a first mounting link 896A which is rigidly secured to a door frame 830 defining a door opening 836 in a manner as previously described for door frame 130 and door frame opening 136. Door hinge 808 further includes a second link, 896B, a third link 896C, a fourth link 896D, and a fifth link 896E. The door hinge 808 further includes a sixth link 896F which is rigidly connected to the door panel 804 as previously described for second four bar linkage fourth link 260 as previously described for door hinge 108.

In the aspect as best seen in FIG. 8B, second link 896B is pivotally connected to the mounting first link 896A at a first pivot point 897A, and pivotally connected to the third link 896C at a second pivot point 897B. The third link 896C is pivotally connected to the mounting first link 896A at a third pivot point 897C, and pivotally connected to the sixth mounting link 896F at a fourth pivot point 897D.

In the illustrated aspect, the fourth link 896D is pivotally connected to the second link 896B at the second pivot point 897B, is pivotally connected to the third link 896C at a fifth pivot point 897E and is also pivotally connected to the fifth link 896E at a sixth pivot point 897F. The fifth link 896E is pivotally connected to the fourth link 896D at the sixth pivot point 897F, and pivotally connected to the sixth link 896F at a seventh pivot point 897G. The described and illustrated links 896A-F may each be of different sizes, lengths, shapes, orientations, and include alternate pivot points than those described and illustrated to suit the desired first door panel 804 path of travel 840, movement envelope 842 or performance specifications.

In the aspect illustrated for door hinge 808, the referenced links 896A-F can be connected using the same devices and methods, and may be manufactured from the same materials, as the links previously described for door hinge 108.

In operation, multi-linkage vehicle door hinge system 800 is typically in a closed position 850 as show in FIG. 8A wherein the first door panel 804 is engaged with the door frame 830 and any weather seals surrounding the door opening 836. A user manipulates a door actuator, for example a door handle, which disengages a door latch from a striker plate (not shown). In implementations in which the multi-linkage vehicle door hinge system 800 is manually operated, door effort reduction devices may assist a user in raising the first door panel between the closed position 850 and the open position 856 as previously described for multi-linkage vehicle door hinge system 100 and door hinge 108. In implementations in which the multi-linkage vehicle door hinge system 800 is power operated, one or more electric motors may apply force to the door hinge 808 through one or more of the second link through fifth link 896B-896E to move the first door panel 804 from the closed position 850 to the open position 856 and back again in a generally similar manner as previously described for multi-linkage vehicle door hinge system 100 and door hinge 108 taking into account the different door hinge 808 geometry and articulation.

In operation, the multi-linkage vehicle door system 800 first door panel 804 path of travel 840 and movement envelope 842 varies from that as described and illustrated for multi-linkage vehicle door hinge system 100 and hinge 108. As shown in FIGS. 8A-8C, the path of travel 840 and movement envelope includes a more radial or rounded course than path of travel 140 but is still relatively parallel to the exterior surface 846 versus prior designs.

In motion between the first door panel 104 closed position 850 and the open position 856, the respective second link through fifth link 896B-896E articulate as described and illustrated in FIGS. 8A-8D to move the first door panel 804 from the closed position 850 to the open position 856 along the path of travel 840. The first door panel 804 moves within the movement envelope 842 which is relatively parallel to an exterior surface 846 of the vehicle.

In an alternate aspect (not shown), the first door panel 804 is further rotated toward a centerline of the vehicle to a folded down position similar to that as shown and described for first door panel 104 and door hinge 108 in FIG. 1C.

In the first door panel 804 open position 856, substantially all of the door opening 836 is clear for passage to enter or exit the vehicle passenger cabin. The first door panel 804 is selectively moved from the open position 156 to the closed position 150 in a reverse manner.

The door hinge 808 connects a door panel 804 to the door frame 830 using the six-bar door hinge 808 described above. The six-bar door hinge 808 may be configured and have relative movement between the respective links according to the description and illustration FIGS. 8A-8D.

The multi-linkage vehicle door system 800 may generally be actuated manually, or through powered actuators for example electric motors, as previously and variously described for multi-linkage vehicle door hinge system 100 and door hinge 108, 408 illustrated in FIG. 4. For example, as generally seen in FIG. 4 as applied to FIGS. 8A-8D, a first electric motor 494*a* and/or a second electric motor 494*b* may be respectively connected to the door frame 830 and/or the first door panel 804 and selectively apply a force to one or more of second link 896*b* through fifth link 896E to move the respective link, and connected links and first door panel 804 between the closed position 850 and the open position 856 and back again. In the example for multi-linkage vehicle door hinge system 800, the first electric motor 494*a* and the second electric motor 494*b* would need to be synchronized if both electric motors are simultaneously used.

In an alternate aspect not shown, and with respect to the multi-link vehicle door hinge system 800 shown in FIGS. 8A-8D, the positions of the first electric motor 494*a* and/or second electric motor 494*b* can be in a different location and apply a force to different links than described above and illustrated in FIG. 4. For example, one of the first electric motor 494a or the second electric motors may be positioned adjacent the fifth pivot joint 897E and apply a force to one or both of the third link 896C and/or the fourth link 896D to move the first door panel 804 relative to the door frame 830.

In an alternate example not shown, and respecting the multi-link vehicle door hinge system 800, an electric motor and a motion transfer assembly as described and illustrated in FIGS. 6 and 7 may be used. For example, an electric motor 694 may be used with a motion transfer assembly 695 connected between the third link 896C and the fourth link 896D to articulate the respective links of door hinge 808 as generally and respectively described for FIGS. 6 and 7 above.

Although the systems and hinges described herein, such as the multi-linkage vehicle door hinge system 100, 800 and the door hinge 108, 808 are described as having particular usefulness for passenger vehicle entry/exit doors, similar benefits are achieved in alternate vehicular applications, for example vehicle liftgates. Further, alternate applications include mass transit vehicles, for example buses, shuttles and other vehicles where high volumes of passengers enter and exit the vehicle.

What is claimed is:

1. A vehicle, comprising:
 a door frame that defines a door opening;
 a door panel;
 a first linkage portion that is pivotally connected to the door frame;
 a second linkage portion that is pivotally connected to the door panel; and
 a coupler that connects the first linkage portion to the second linkage portion,
 wherein the first linkage portion and the second linkage portion are configured so that the door panel moves between a closed position and an open position with respect to the door opening of the door frame in a narrow movement envelope.

2. The vehicle of claim 1, wherein the narrow movement envelope defines a physical space that the door panel moves through as the first door panel moves between the closed position and the open position.

3. The vehicle of claim 1, wherein the narrow movement envelope is located a maximum distance of four hundred (400) millimeters from an external surface of the vehicle in a y-coordinate direction.

4. The vehicle of claim 1, wherein the narrow movement envelope is substantially parallel to an exterior surface of the vehicle.

5. The vehicle of claim 1, wherein the door panel moves between the closed position and the open position along a path of travel within the narrow movement envelope.

6. The vehicle of claim 5, wherein the path of travel defines a vertical lift distance of at least one thousand (1000) millimeters in a z-coordinate direction.

7. The vehicle of claim 1, wherein the first linkage portion is pivotally connected to the coupler and the second linkage portion is pivotally connected to the coupler.

8. The vehicle of claim 1, wherein the first linkage portion is a first four bar linkage and the second linkage portion is a second four bar linkage.

9. The vehicle of claim 1, wherein the door panel covers the door opening in the closed position and the door panel allows passage through the door opening in the open position.

10. A vehicle, comprising:
 a door frame that defines a door opening;
 a door panel;
 a first linkage portion that is pivotally connected to the door frame;
 a second linkage portion that is pivotally connected to the door panel; and
 a coupler that connects the first linkage portion to the second linkage portion,
 wherein the first linkage portion and the second linkage portion cause the door panel to follow a path of travel between a closed position and an open position with respect to the door opening of the door frame.

11. The vehicle of claim 10, wherein the first linkage portion and the second linkage portion lift the door panel along a first portion of the path of travel and rotate the door panel toward a centerline of the vehicle along a second portion of the path of travel.

12. The vehicle of claim 10, wherein the first linkage portion and the second linkage portion are not simultaneously fully extended in a y-coordinate direction along the path of travel.

13. The vehicle of claim 10, wherein the path of travel defines a vertical lift distance of at least one thousand (1000) millimeters in a z-coordinate direction.

14. The vehicle of claim 10, wherein the door panel moves between the closed position and the open position within a movement envelope that defines a physical space that the door panel moves through as the first door panel moves between the closed position and the open position.

15. The vehicle of claim 14, wherein the movement envelope is substantially parallel to an exterior surface of the vehicle.

16. The vehicle of claim 14, wherein the movement envelope is located a maximum distance of four hundred (400) millimeters from an external surface of the vehicle in a y-coordinate direction.

17. A vehicle, comprising:
 a door frame that defines a door opening;
 a door panel;
 a first linkage portion that is pivotally connected to the door frame;
 a second linkage portion that is pivotally connected to the door panel; and
 an actuation system that controls relative motion of the first linkage portion with respect to the second linkage portion while the first linkage portion and the second linkage portion move the door panel between a closed position and an open position with respect to the door opening of the door frame.

18. The vehicle of claim 17, wherein the actuation system includes a first electric motor that is connected to the door frame and applies a first rotational force to the first linkage portion and a second electric motor that is connected to the door panel and applies a second rotational force to the second linkage portion.

19. The vehicle of claim 17, further comprising:
 a coupler that connects the first linkage portion to the second linkage portion, wherein the actuation system includes a first electric motor that is connected to the coupler and applies a first rotational force to the first linkage portion and a second electric motor that is connected to the coupler and applies a second rotational force to the second linkage portion.

20. The vehicle of claim 17, wherein the actuation system includes an electric motor that applies a rotational force to one of the first linkage portion or the second linkage portion and a motion transfer assembly that interconnects the first linkage portion and the second linkage portion to cause relative motion of the first linkage portion and the second linkage portion.

* * * * *